United States Patent
You et al.

(10) Patent No.: US 10,257,797 B2
(45) Date of Patent: Apr. 9, 2019

(54) SYNCHRONIZATION SIGNAL RECEIVING METHOD AND USER APPARATUS, AND SYNCHRONIZATION SIGNAL TRANSMISSION METHOD AND BASE STATION

(71) Applicant: LG ELECTRONICS INC., Seoul (KR)

(72) Inventors: Hyangsun You, Seoul (KR); Seonwook Kim, Seoul (KR); Joonkui Ahn, Seoul (KR); Yunjung Yi, Seoul (KR); Byounghoon Kim, Seoul (KR); Suckchel Yang, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 40 days.

(21) Appl. No.: 15/502,481

(22) PCT Filed: Aug. 7, 2015

(86) PCT No.: PCT/KR2015/008287
§ 371 (c)(1),
(2) Date: Feb. 7, 2017

(87) PCT Pub. No.: WO2016/021979
PCT Pub. Date: Feb. 11, 2016

(65) Prior Publication Data
US 2017/0238272 A1    Aug. 17, 2017

Related U.S. Application Data

(60) Provisional application No. 62/034,751, filed on Aug. 7, 2014, provisional application No. 62/074,632, filed on Nov. 3, 2014, provisional application No. 62/131,839, filed on Mar. 12, 2015, provisional application No. 62/161,211, filed on May 13, 2015.

(51) Int. Cl.
*H04W 56/00* (2009.01)
*H04J 11/00* (2006.01)
(Continued)

(52) U.S. Cl.
CPC ..... *H04W 56/0015* (2013.01); *H04J 11/0073* (2013.01); *H04J 11/0076* (2013.01);
(Continued)

(58) Field of Classification Search
CPC .............. H04W 56/0015; H04W 8/005; H04J 11/0073; H04J 11/0076; H04J 11/0079
See application file for complete search history.

(56) References Cited

U.S. PATENT DOCUMENTS

2010/0029216 A1   2/2010   Jovicic et al.
2012/0129522 A1   5/2012   Kim et al.
(Continued)

OTHER PUBLICATIONS

PCT International Application No. PCT/KR2015/008287, Written Opinion of the International Searching Authority dated Dec. 15, 2015, 19 pages.
(Continued)

*Primary Examiner* — Peter P Chau
(74) *Attorney, Agent, or Firm* — Lee Hong Degerman Kang Waimey

(57) ABSTRACT

Provided are a method and a device whereby a synchronization signal is transmitted and received. One embodiment of the present invention involves using one of a plurality of cells (first cell hereinbelow) in order to transmit synchronization signal setting information of a cell (second cell hereinbelow) set in an unlicensed band of the plurality of cells. The synchronization signal is transmitted on the second cell, based on the synchronization signal setting infor-
(Continued)

mation. The synchronization signal is used in order to acquire time and frequency synchronization with the second cell.

20 Claims, 19 Drawing Sheets

(51) Int. Cl.
 *H04W 8/00* (2009.01)
 *H04L 5/00* (2006.01)
 *H04W 48/16* (2009.01)
(52) U.S. Cl.
 CPC .......... *H04J 11/0079* (2013.01); *H04L 5/001* (2013.01); *H04W 8/005* (2013.01); *H04J 11/0069* (2013.01); *H04W 48/16* (2013.01)

(56) References Cited

U.S. PATENT DOCUMENTS

| | | | | |
|---|---|---|---|---|
| 2013/0201884 | A1* | 8/2013 | Freda | H04W 72/005 370/278 |
| 2013/0315152 | A1 | 11/2013 | Ratasuk et al. | |
| 2014/0044105 | A1 | 2/2014 | Bontu et al. | |
| 2014/0050206 | A1 | 2/2014 | Seo et al. | |
| 2014/0140314 | A1* | 5/2014 | Wei | H04W 48/12 370/329 |
| 2015/0092768 | A1* | 4/2015 | Ng | H04W 48/16 370/350 |
| 2015/0215856 | A1* | 7/2015 | Kim | H04W 48/16 370/252 |
| 2015/0223149 | A1* | 8/2015 | Liu | H04W 48/12 370/252 |
| 2015/0223245 | A1* | 8/2015 | Cheng | H04W 48/16 370/329 |
| 2015/0372778 | A1* | 12/2015 | Xu | H04J 11/005 370/329 |
| 2016/0337993 | A1* | 11/2016 | Takeda | H04L 5/0048 |
| 2017/0195028 | A1* | 7/2017 | Shimezawa | H04B 7/0626 |

OTHER PUBLICATIONS

Hitachi Ltd., "Discovery Signal for Small Cells", R1-141396, 3GPP TSG RAN WG1 Meeting #76bis, Apr. 2014, 3 pages.
NTT DOCOMO, Inc., "Views on LAA for Unlicensed Spectrum-Scenarios and Initial Evaluation Results", RWS-140026, 3GPP workshop on LTE in unlicensed spectrum, Jun. 13, 2014, 12 pages.

* cited by examiner

FIG. 9
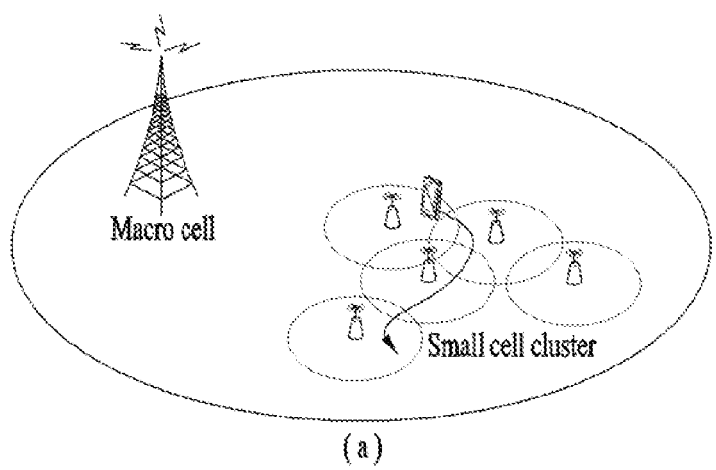
(a)
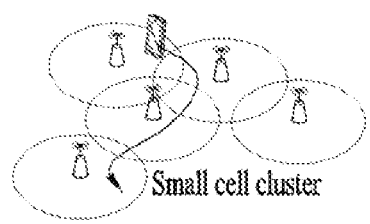
(b)

FIG. 12
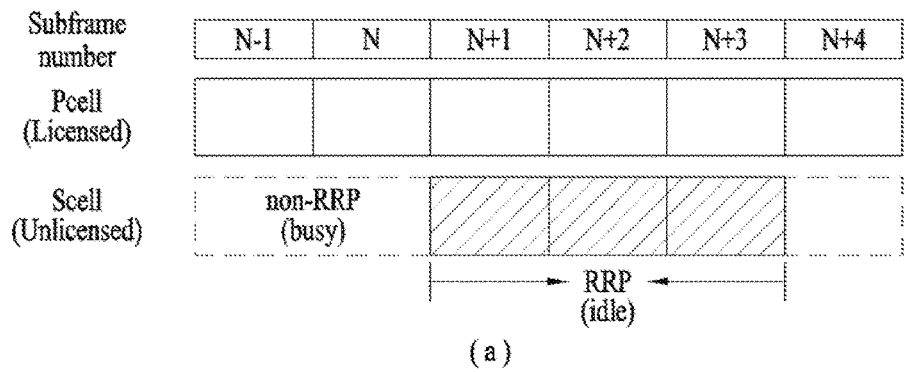
(a)
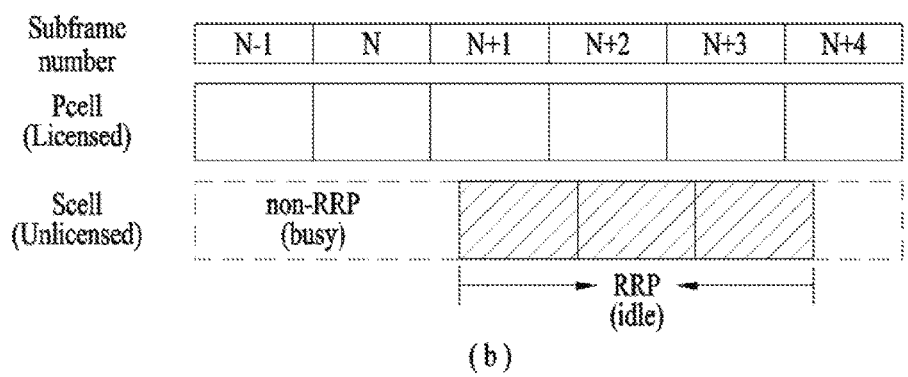
(b)
FIG. 13
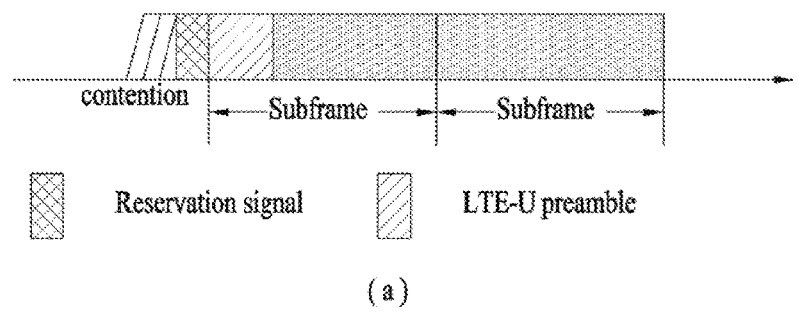
(a)
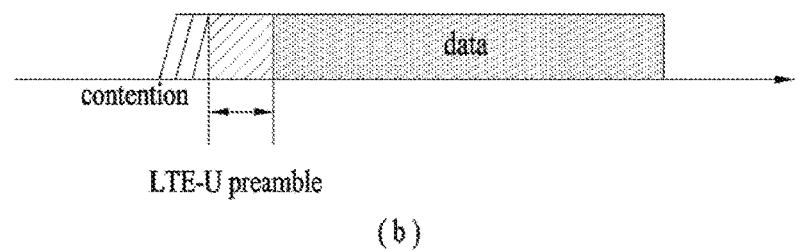
(b)

SYNCHRONIZATION SIGNAL RECEIVING METHOD AND USER APPARATUS, AND SYNCHRONIZATION SIGNAL TRANSMISSION METHOD AND BASE STATION

CROSS-REFERENCE TO RELATED APPLICATIONS

This application is the National Stage filing under 35 U.S.C. 371 of International Application No. PCT/KR2015/008287, filed on Aug. 7, 2015, which claims the benefit of U.S. Provisional Application Nos. 62/034,751, filed on Aug. 7, 2014, 62/074,632, filed on Nov. 3, 2014, 62/131,839, filed on Mar. 12, 2015, and 62/161,211, filed on May 13, 2015, the contents of which are all hereby incorporated by reference herein in their entirety.

TECHNICAL FIELD

The present invention relates to a wireless communication system and, more particularly, to a method and apparatus for transmitting a synchronization signal.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DETAILED DESCRIPTION OF THE INVENTION

Technical Problems

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

In addition, a method of simultaneously transmitting more signals by aggregating carriers used by different systems is needed.

The technical objects that can be achieved through the present invention are not limited to what has been particularly described hereinabove and other technical objects not described herein will be more clearly understood by persons skilled in the art from the following detailed description.

Technical Solutions

The present invention provides a method and apparatus for transmitting or receiving a synchronization signal. According to an embodiment of the present invention, synchronization signal configuration information of a cell (hereinafter, a second cell) configured in an unlicensed band among a plurality of cells is transmitted through any one (hereinafter, a first cell) of the plural cells. The synchronization signal is transmitted on the second cell based on the synchronization signal configuration information. The synchronization signal may be used to acquire time and frequency synchronization with the second cell.

In an aspect of the present invention, provided herein is a method of receiving a synchronization signal by a user equipment (UE) configured with a plurality of cells, including receiving a synchronization signal of a cell (hereinafter, a second cell) configured on an unlicensed band. The method includes receiving synchronization signal configuration information through any one (hereinafter, a first cell) of the plural cells; and receiving the synchronization signal on the second cell based on the synchronization signal configuration information. The method may include acquiring time and frequency synchronization with the second cell using the synchronization signal.

In another aspect of the present invention, provided herein is a user equipment (UE) for receiving a synchronization signal, the UE being configured with a plurality of cells, including a radio frequency (RF) unit configured to receive a signal and a processor configured to control the RF unit. The processor may cause the RF unit to receive a synchronization signal of a cell (hereinafter, a second cell) configured on an unlicensed band among the plural cells. The processor may control the RF unit to receive, through any one (hereinafter, a first cell) of the plural cells, synchronization signal configuration information of the second cell configured in an unlicensed band among the plural cells. The processor may control the RF unit to receive the synchronization signal on the second cell based on the synchronization signal configuration information.

In another aspect of the present invention, provided herein is a method of transmitting a synchronization signal of a cell (hereinafter, a second cell) configured in an unlicensed band by a base station (BS). The method may include transmitting, through any one (hereinafter, a first cell) of the plural cells, synchronization signal configuration information of the second cell among the plural cells. The method may include transmitting the synchronization signal on the second cell based on the synchronization signal configuration information.

In another aspect of the present invention, provided herein is a base station (BS) for transmitting a synchronization signal, including a radio frequency (RF) unit configured to transmit a signal and a processor configured to control the RF unit. The processor may cause the RF unit to transmit a synchronization signal of a cell (hereinafter, a second cell) configured in an unlicensed band. The processor may control the RF unit to transmit, through any one (hereinafter, a first cell) of the plural cells, synchronization signal configuration information of the second cell among the plural cells. The processor may control the RF unit to transmit the synchronization signal on the second cell based on the synchronization signal configuration information.

In each aspect of the present invention, the synchronization signal configuration information may include information indicating whether the synchronization signal is present in a reserved resource period (RRP) configured on the second cell.

In each aspect of the present invention, the synchronization signal configuration information may be transmitted or received through a physical downlink control channel carrying scheduling information of the second cell on the first cell In each aspect of the present invention, the first cell may be a cell configured on a licensed band.

In each aspect of the present invention, the synchronization signal configuration information may include at least information about a period or a duration of the synchronization signal.

In each aspect of the present invention, the synchronization signal configuration information may include at least information indicating one or more synchronization signal resources configured for transmission of the synchronization signal.

In each aspect of the present invention, information indicating a resource having the synchronization signal among the one or more synchronization signal resources may be transmitted or received.

In each aspect of the present invention, the synchronization signal may be repeatedly transmitted or received on at least a time axis or a frequency axis on the second cell.

In each aspect of the present invention, at least a primary synchronization signal (PSS) or a secondary synchronization signal (SSS) having a different phase according to OFDM symbols may be transmitted or received as the synchronization signal.

In each aspect of the present invention, a predetermined number of resource elements among resource elements to which a frequency axis sequence d(0), d(1), . . . , d(61) of the PSS or the SSS received as the synchronization signal is mapped may be zero power.

In each aspect of the present invention, the PSS or the SSS received as the synchronization signal may be repeated multiple times at least in one OFDM symbol or on a frequency axis.

In each aspect of the present invention, the PSS or the SSS transmitted or received as the synchronization signal may be a compressed form on a time axis.

The above technical solutions are merely some parts of the embodiments of the present invention and various embodiments into which the technical features of the present invention are incorporated can be derived and understood by persons skilled in the art from the following detailed description of the present invention.

Advantageous Effect

According to an embodiment of the present invention, uplink/downlink signals can be efficiently transmitted/received. Therefore, overall throughput of a wireless communication system is improved.

According to an embodiment of the present invention, a new carrier which is not dedicated to a legacy system can be aggregated with a carrier of the legacy system while maintaining compatibility with the legacy system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 9 illustrates the concept of a small cell.

FIG. 12 illustrates a subframe configuration of a reserved resource period (RRP).

FIG. 13 illustrates examples of LTE-U preamble transmission that can be performed in embodiments of the present invention.

MODE FOR CARRYING OUT THE INVENTION

Figure 1:
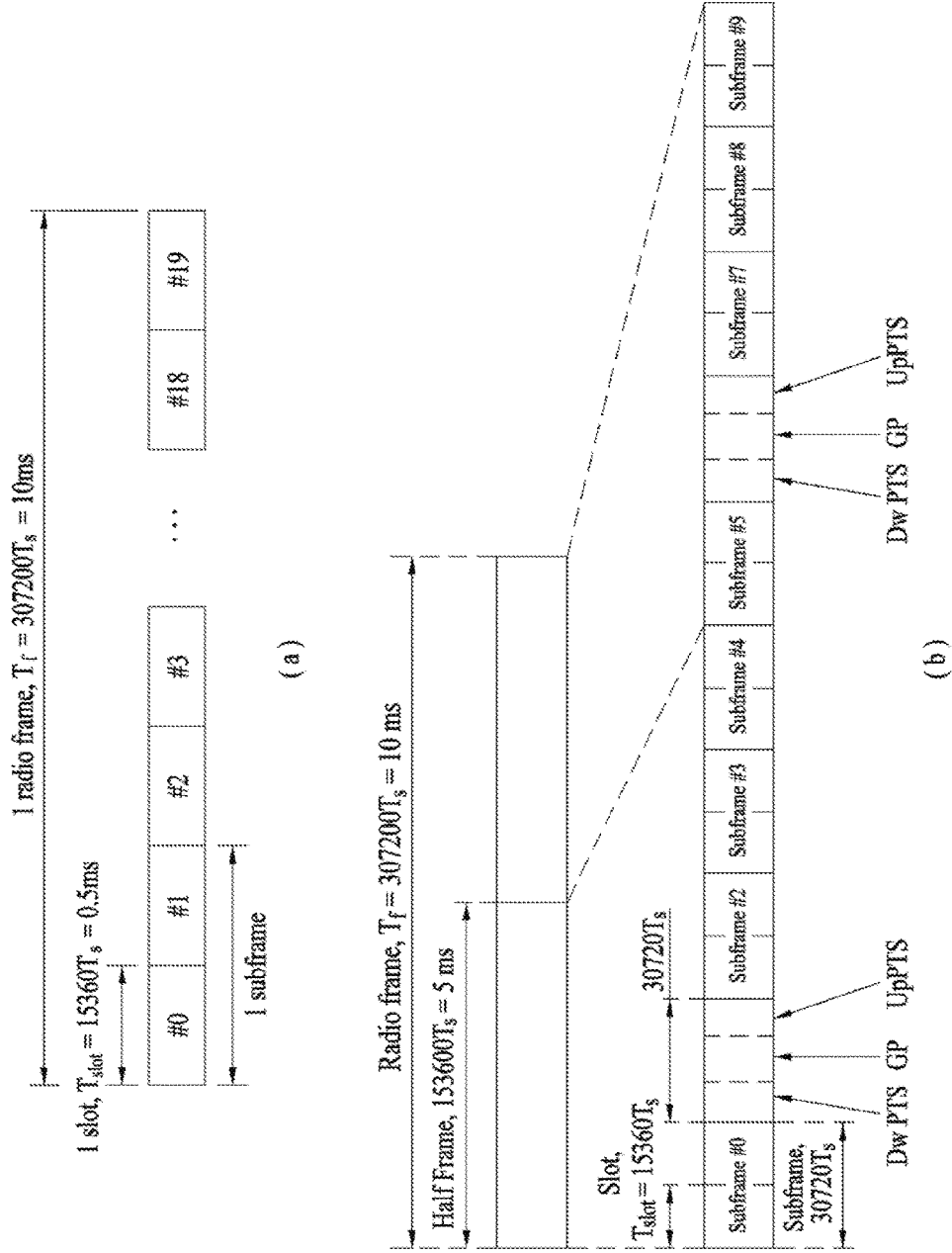
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point.

In the present invention, a cell refers to a prescribed geographic region to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. In a LTE/LTE-A based system, The UE may measure DL channel state received from a specific node using cell-specific reference signal(s) (CRS(s)) transmitted on a CRS resource allocated by antenna port(s) of the specific node to the specific node and/or channel state information reference signal(s) (CSI-RS(s)) transmitted on a CSI-RS resource. Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DMRS) for a UL control/data signal and a sounding reference signal (SRS) used for UL channel measurement are defined as the UL physical signal.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS is assigned or configured will be referred to as CRS/DMRS/CSI-RS/SRS/UE-RS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A. The frame structure of FIG. 1(a) is referred to as frame structure type 1 (FS1) and the frame structure of FIG. 1(b) is referred to as frame structure type 2 (FS2).

Referring to FIG. 1, a 3GPP LTE/LTE-A radio frame is 10 ms ($307,200T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz$)$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 2:
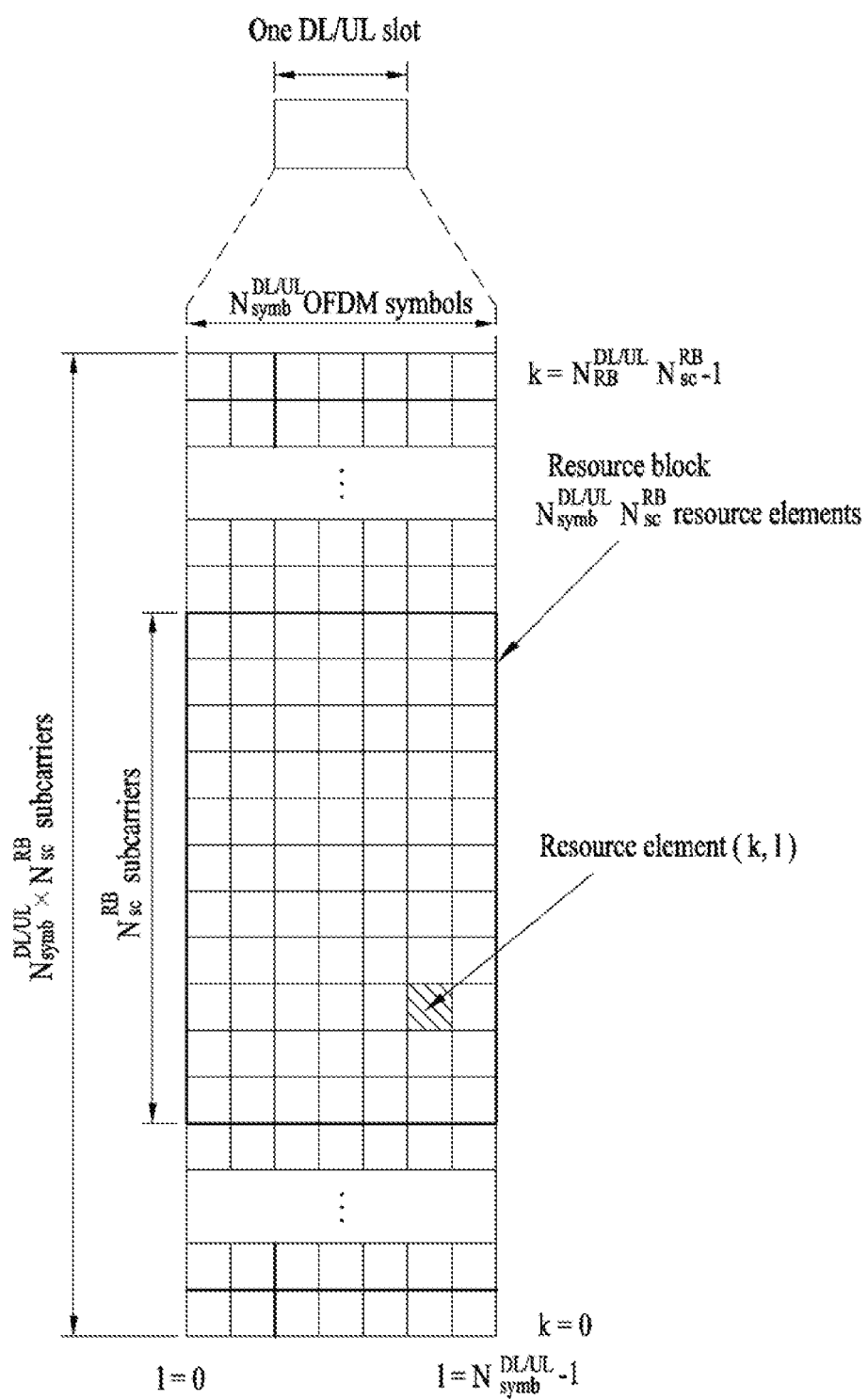
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{DL}_{RB}$ denotes the number of RBs in a UL slot. $N^{DL}_{RB}$ and $N^{DL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb}*N^{RB}_{sc}$ REs. Each RE within a resource grid may be uniquely defined by an index pair (k, l) within one slot. k is an index ranging from 0 to $N^{DL/UL}_{RB}*N^{RB}_{sc}-1$ in the frequency domain, and l is an index ranging from 0 to $N^{DL/UL}_{symb}-1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb}*N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
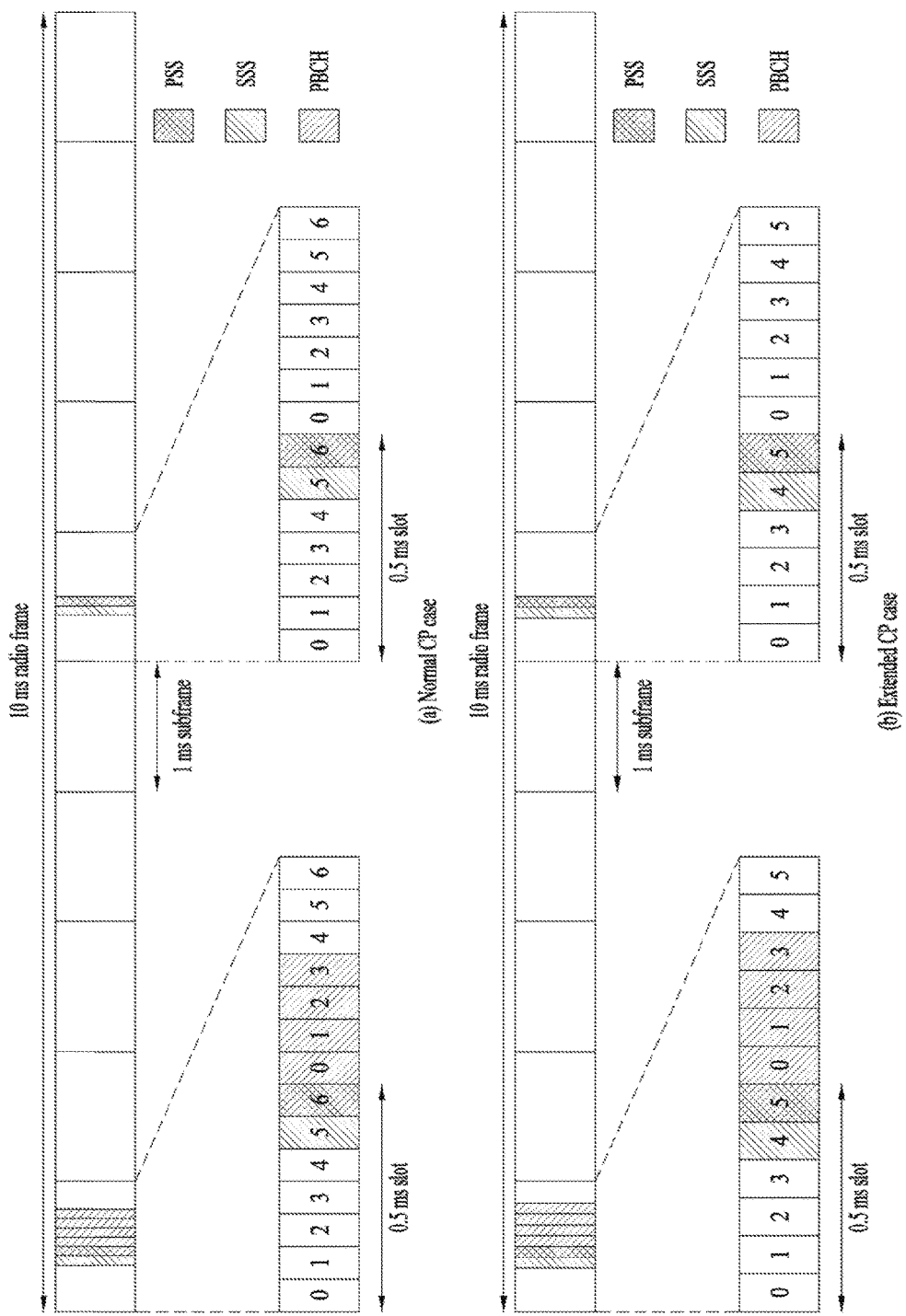
FIG. 3 illustrates a radio frame structure for transmission of a synchronization signal (SS).

FIG. 3 illustrates a radio frame structure for transmission of a synchronization signal (SS). Specifically, FIG. 3 illustrates a radio frame structure for transmission of an SS and a PBCH in frequency division duplex (FDD), wherein FIG. 3(a) illustrates transmission locations of an SS and a PBCH in a radio frame configured as a normal cyclic prefix (CP) and FIG. 3(b) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

An SS will be described in more detail with reference to FIG. 3. An SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIG. 3, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined.

An SS may represent a total of 504 unique physical layer cell IDs by a combination of 3 PSSs and 168 SSSs. In other words, the physical layer cell IDs are divided into 168 physical layer cell ID groups each including three unique IDs so that each physical layer cell ID is a part of only one physical layer cell ID group. Accordingly, a physical layer cell ID $N^{cell}_{ID}$ (=$3N^{(1)}_{ID}+N^{(2)}_{ID}$) is uniquely defined as number $N^{(1)}_{ID}$ in the range of 0 to 167 indicating a physical layer cell ID group and number $N^{(2)}_{ID}$ from 0 to 2 indicating the physical layer ID in the physical layer cell ID group. A UE may be aware of one of three unique physical layer IDs by detecting the PSS and may be aware of one of 168 physical layer cell IDs associated with the physical layer ID by detecting the SSS. A length-63 Zadoff-Chu (ZC) sequence is defined in the frequency domain and is used as the PSS. As an example, the ZC sequence may be defined by the following equation.

$$d_u(n) = e^{-j\frac{\pi u n(n+1)}{N_{ZC}}} \qquad \text{Equation 1}$$

where $N_{ZC}$=63 and a sequence element corresponding to a DC subcarrier, n=31, is punctured.

The PSS is mapped to 6 RBs (=72 subcarriers) near to a center frequency. Among the 72 subcarriers, 9 remaining subcarriers carry a value of always 0 and serve as elements facilitating filter design for performing synchronization. To define a total of three PSSs, u=24, 29, and 34 are used in Equation 1. Since u=24 and u=34 have a conjugate symmetry relationship, two correlations may be simultaneously performed. Here, conjugate symmetry indicates the relationship of the following Equation.

$$d_u(n)=(-1)^n(d_{N_{ZC}-u}(n))^*, \text{ when } N_{ZC} \text{ is even number}$$

$$d_u(n)=(d_{N_{ZC}-u}(n))^*, \text{ when } N_{ZC} \text{ is odd number} \quad \text{Equation 2}$$

A one-shot correlator for u=29 and u=34 may be implemented using the characteristics of conjugate symmetry. The entire amount of calculation can be reduced by about 33.3% as compared with the case without conjugate symmetry.

In more detail, a sequence d(n) used for a PSS is generated from a frequency-domain ZC sequence as follows.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{Equation 3}$$

In Equation 3, the Zadoff-Chu root sequence index u is given by the following table.

TABLE 3

| $N^{(2)}_{ID}$ | Root index u |
|---|---|
| 0 | 25 |
| 1 | 29 |
| 2 | 34 |

Referring to FIG. 3, upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

A sequence used for the SSS is an interleaved concatenation of two length-31 m-sequences of and the concatenated sequence is scrambled by a scrambling sequence given by a PSS. Here, an m-sequence is a type of a pseudo noise (PN) sequence.

If two m-sequences used for generating an SSS code are S1 and S2, then two different PSS-based sequences S1 and S2 are scrambled into the SSS. In this case, S1 and S2 are scrambled by different sequences. A PSS-based scrambling code may be obtained by cyclically shifting an m-sequence generated from a polynomial of $x^5+x^3+1$ and 6 sequences are generated by cyclic shift of the m-sequence according to an index of a PSS. Next, S2 is scrambled by an S1-based scrambling code. The S1-based scrambling code may be obtained by cyclically shifting an m-sequence generated from a polynomial of $x^5+x^4+x^2+x^1+1$ and 8 sequences are generated by cyclic shift of the m-sequence according to an index of S1. The SSS code is swapped every 5 ms, whereas the PSS-based scrambling code is not swapped. For example, assuming that an SSS of subframe 0 carries a cell group ID by a combination of (S1, S2), an SSS of subframe 5 carries a sequence swapped as (S2, S1). Hence, a boundary of a radio frame of 10 ms can be discerned. In this case, the used SSS code is generated from a polynomial of $x^5+x^2+1$ and a total of 31 codes may be generated by different cyclic shifts of an m-sequence of length-31.

A combination of two length-31 m-sequences for defining the SSS is different in subframe 0 and subframe 5 and a total of 168 cell group IDs are expressed by a combination of the two length-31 m-sequences. The m-sequences used as sequences of the SSS have a robust property in a frequency selective environment. In addition, since the m-sequences can be transformed by high-speed m-sequence transform using fast Hadamard transform, if the m-sequences are used as the SSS, the amount of calculation necessary for a UE to interpret the SSS can be reduced. Since the SSS is configured by two short codes, the amount of calculation of the UE can be reduced.

Generation of the SSS will now be described in more detail. A sequence d(0), . . . , d(61) used for the SSS is an interleaved concatenation of two length-31 binary sequences. The concatenated sequence is scrambled by a sequence given by the PSS.

A combination of two length-31 sequences for defining the PSS becomes different in subframe 0 and subframe 5 according to the following.

$$d(2n) = \begin{cases} s_0^{(m_0)}(n)c_0(n) & \text{in subframe 0} \\ s_1^{(m_1)}(n)c_0(n) & \text{in subframe 5} \end{cases} \quad \text{Equation 4}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

In Equation 4, 0≤n≤30. The indices $m_0$ and $m_1$ are derived from the physical-layer cell-identity group $N^{(1)}_{ID}$ according to the following.

$$m_0 = m' \bmod 31 \quad \text{Equation 5}$$
$$m_1 = (m_0 + \lfloor m'/31 \rfloor + 1) \bmod 31$$
$$m' = N^{(1)}_{ID} + q(q+1)/2,$$
$$q = \left\lfloor \frac{N^{(1)}_{ID} + q'(q'+1)/2}{30} \right\rfloor,$$
$$q' = \lfloor N^{(1)}_{ID}/30 \rfloor$$

The output of Equation 5 is listed in Table 4 following Equation 11.

The two sequences $s^{(m0)}_0(n)$ and $s^{(m1)}_1(n)$ are defined as two different cyclic shifts of the m-sequence s(n).

$$s_0^{(m0)}(n)=s((n+m_0) \bmod 31)$$

$$s_1^{(m1)}(n)=s((n+m_1) \bmod 31) \quad \text{Equation 6}$$

In Equation 6, s(i)=1−2x(i), 0≤i≤30, is defined by the following equation with initial conditions x(0)=0, x(1)=0, x(2), x(3)=0, x(4)=1.

$$x(\bar{i}+5)=(x(\bar{i}+3)+x(\bar{i})) \bmod 2, \ 0 \leq i \leq 25 \quad \text{Equation 7}$$

The two scrambling sequences $c_0(n)$ and $c_1(n)$ depend on the PSS and are defined by two different cyclic shifts of the m-sequence c(n) according to the following equation.

$$c_0(n)=c((n+N_{ID}^{(2)})) \bmod 31$$

$$c_1(n)=c((n+N_{ID}^{(2)}+3) \bmod 31) \quad \text{Equation 8}$$

In Equation 8, $N^{(2)}_{ID} \in \{0,1,2\}$ is the physical-layer identity within the physical-layer cell identity group $N^{(1)}_{ID}$ and c(i)=1−2x(i) (0≤i≤30), is defined by the following equation with initial conditions x(0)=0, x(1)=0, x(2), x(3)=0, x(4)=1.

$$x(\bar{i}+5)=(x(\bar{i}+3)+x(\bar{i})) \bmod 2, \ 0 \leq \bar{i} \leq 25 \quad \text{Equation 9}$$

The scrambling sequences $z^{(m0)}_1(n)$ and $z^{(m1)}_1(n)$ are defined by a cyclic shift of the m-sequence $z(n)$ according to the following equation.

$$z_1^{(m0)}(n) = z((n+(m_0 \bmod 8)) \bmod 31)$$

$$z_1^{(m1)}(n) = z((n+(m_1 \bmod 8)) \bmod 31) \quad \text{Equation 10}$$

In Equation 10, $m_0$ and $m_1$ are obtained from Table 4 following Equation 11 and $z(i)=1-2x(i)$, $0 \leq i \leq 30$, is defined by the following equation with initial conditions $x(0)=0$, $x(1)=0$, $x(2)$, $x(3)=0$, $x(4)=1$.

$$x(\bar{i}+5) = (x(\bar{i}+4) + x(\bar{i}+2) + x(\bar{i}+1) + x(\bar{i})) \bmod 2, \quad 0 \leq \bar{i} \leq 25 \quad \text{Equation 11}$$

TABLE 4

| $N^{(1)}_{ID}$ | $m_0$ | $m_1$ |
| --- | --- | --- |
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |

TABLE 4-continued

| $N^{(1)}_{ID}$ | $m_0$ | $m_1$ |
|---|---|---|
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |

In this way, for cell search/re-search, the UE may receive the PSS and the SSS from the eNB to establish synchronization with the eNB and acquire information such as a cell identity (ID). Next, the UE may receive broadcast information in a cell managed by the eNB on a PBCH.

The contents of a message of the PBCH are represented as a master information block (MIB) in a radio resource control (RRC) layer.

A UE, which has demodulated a DL signal by performing a cell search procedure using an SSS and determined time and frequency parameters necessary for transmitting a UL signal at an accurate time, can communicate with an eNB only after acquiring system information necessary for system configuration of the UE from the eNB.

The system information is configured by a master information block (MIB) and system information blocks (SIBs). Each SIB includes a set of functionally associated parameters and is categorized into an MIB, SIB Type 1 (SIB1), SIB Type 2 (SIB2), and SIB3 to SIB8 according to included parameters. The MIB includes most frequency transmitted parameters which are essential for initial access of the UE to a network of the eNB. SIB1 includes parameters needed to determine if a specific cell is suitable for cell selection, as well as information about time-domain scheduling of the other SIBs.

The UE may receive the MIB through a broadcast channel (e.g. a PBCH). The MIB includes DL bandwidth (BW), PHICH configuration, and a system frame number SFN. Accordingly, the UE can be explicitly aware of information about the DL BW, SFN, and PHICH configuration by receiving the PBCH. Meanwhile, information which can be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

The PBCH is mapped to four subframes during 40 ms. The time of 40 ms is blind-detected and explicit signaling about 40 ms is not separately present. In the time domain, the PBCH is transmitted on OFDM symbols 0 to 3 of slot 1 in subframe 0 (the second slot of subframe 0) of a radio frame.

In the frequency domain, a PSS/SSS and a PBCH are transmitted only in a total of 6 RBs, i.e. a total of 72 subcarriers, irrespective of actual system BW, wherein 3 RBs are in the left and the other 3 RBs are in the right centering on a DC subcarrier on corresponding OFDM symbols. Therefore, the UE is configured to detect or decode the SS and the PBCH irrespective of DL BW configured for the UE.

After initial cell search, a UE which has accessed a network of an eNB may acquire more detailed system information by receiving a PDCCH and a PDSCH according to information carried on the PDCCH. The UE which has performed the above-described procedure may perform reception of a PDCCH/PDSCH and transmission of a PUSCH/PUCCH as a normal UL/DL signal transmission procedure.

The UE having finished initial cell search may perform the random access procedure to complete access to the eNB. To this end, the UE may transmit a preamble through a physical random access channel (PRACH), and receive a response message which is a response to the preamble through a PDCCH and PDSCH. In the case of contention-based random access, transmission of an additional PRACH and a contention resolution procedure for the PDCCH and a PDSCH corresponding to the PDCCH may be performed.

After performing the procedure described above, the UE may perform PDCCH/PDSCH reception and PUSCH/PUCCH transmission as a typical procedure of transmission of an uplink/downlink signal.

The random access procedure is also referred to as a random access channel (RACH) procedure. The random access procedure is used for various purposes including initial access, adjustment of uplink synchronization, resource assignment, and handover. Random access procedures are classified into a contention-based procedure and a dedicated (i.e., non-contention-based) procedure. The contention-based random access procedure is used for general operations including initial access, while the dedicated random access procedure is used for limited operations such as handover. In the contention-based random access procedure, the UE randomly selects a RACH preamble sequence. Accordingly, it is possible that multiple UEs transmit the same RACH preamble sequence at the same time. Thereby, a contention resolution procedure needs to be subsequently performed. On the other hand, in the dedicated random access procedure, the UE uses an RACH preamble sequence that the eNB uniquely allocates to the UE. Accordingly, the random access procedure may be performed without contention with other UEs.

The contention-based random access procedure includes the following four steps. Messages transmitted in Steps 1 to 4 given below may be referred to as Msg1 to Msg4.

Step 1: RACH preamble (via PRACH) (from UE to eNB)
Step 2: Random access response (RAR) (via PDCCH and PDSCH) (from eNB to UE)
Step 3: Layer 2/layer 3 message (via PUSCH) (from UE to eNB)
Step 4: Contention resolution message (from eNB to UE)

The dedicated random access procedure includes the following three steps. Messages transmitted in Steps 0 to 2 may be referred to as Msg0 to Msg2, respectively. Uplink transmission (i.e., Step 3) corresponding to the RAR may also be performed as a part of the random access procedure. The dedicated random access procedure may be triggered using a PDCCH for ordering transmission of an RACH preamble (hereinafter, a PDCCH order).

Step 0: RACH preamble assignment (from eNB to UE) through dedicated signaling

Step 1: RACH preamble (via PRACH) (from UE to eNB)

Step 2: RAR (via PDCCH and PDSCH) (from eNB to UE)

After transmitting the RACH preamble, the UE attempts to receive a random access response (RAR) within a preset time window. Specifically, the UE attempts to detect a PDCCH with RA-RNTI (Random Access RNTI) (hereinafter, RA-RNTI PDCCH) (e.g., CRC is masked with RA-RNTI on the PDCCH) in the time window. In detecting the RA-RNTI PDCCH, the UE checks the PDSCH for presence of an RAR directed thereto. The RAR includes timing advance (TA) information indicating timing offset information for UL synchronization, UL resource allocation information (UL grant information), and a random UE identifier (e.g., temporary cell-RNTI (TC-RNTI)). The UE may perform UL transmission (of, e.g., Msg3) according to the resource allocation information and the TA value in the RAR. HARQ is applied to UL transmission corresponding to the RAR. Accordingly, after transmitting Msg3, the UE may receive acknowledgement information (e.g., PHICH) corresponding to Msg3.

Figure 4:
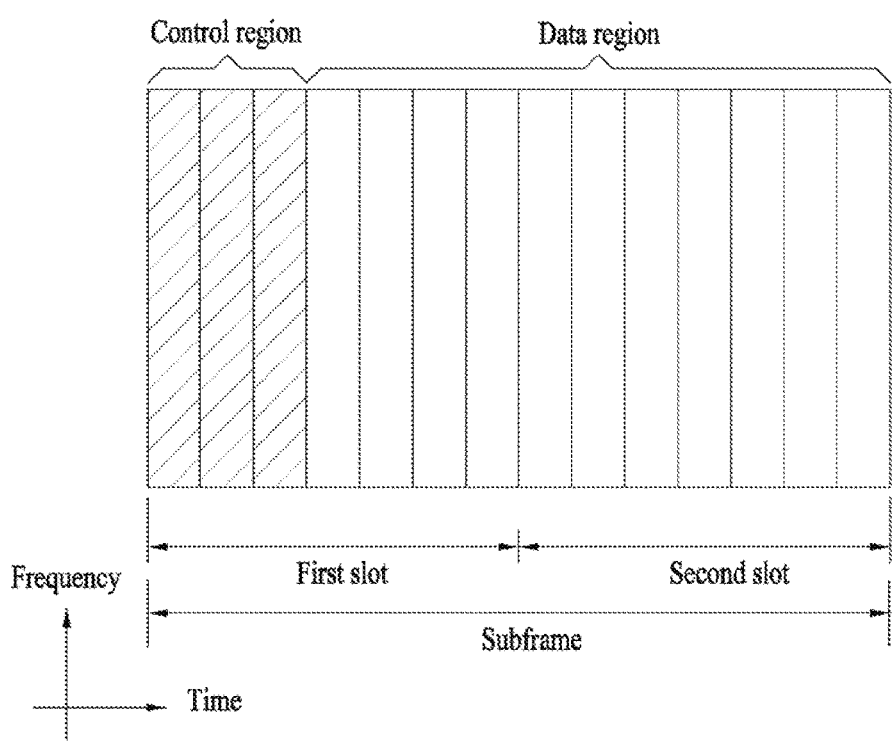
FIG. 4 illustrates the structure of a downlink (DL) subframe used in a wireless communication system.

FIG. 4 illustrates the structure of a DL subframe used in a wireless communication system.

Referring to FIG. 4, a DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH). A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

If RRH technology, cross-carrier scheduling technology, etc. are introduced, the amount of PDCCH which should be transmitted by the eNB is gradually increased. However, since a size of a control region within which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH). The EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that(those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS. The DMRS associated with EPDCCH is transmitted on the same antenna port $p \in \{107, 108, 109, 110\}$ as the associated EPDCCH physical resource, is present for EPDCCH demodulation only if the EPDCCH transmission is associated with the corresponding antenna port, and is transmitted only on the PRB(s) upon which the corresponding EPDCCH is mapped.

A certain number of REs are used on each RB pair for transmission of the DMRS for demodulation of the EPDCCH regardless of the UE or cell if the type of EPDCCH and the number of layers are the same as in the case of the UE-RS for demodulation of the PDSCH. Hereinafter, a PDCCH and an EPDCCH are simply referred to as PDCCHs except in cases specific to the EPDCCH. The present invention may be applied to an EPDCCH, a PUSCH, and a PDSCH and/or a PUSCH scheduled by the EPDCCH as well as to a PDCCH, a PUCCH, and a PDSCH and/or a PUSCH scheduled by the PDCCH.

In a 3GPP LTE/LTE-A system, a CCE set in which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) "A" and information about data transmitted using a radio resource "B" (e.g. frequency location) and using transport format information "C" (e.g. transmission block size, modulation scheme, coding information, etc.) is transmitted in a specific DL subframe. Then, the UE monitors the PDCCH using RNTI information thereof. The UE having the RNTI "A" receives the PDCCH and receives the PDSCH indicated by "B" and "C" through information of the received PDCCH.

Generally, a DCI format capable of being transmitted to a UE differs according to a transmission mode (TM) configured for the UE. In other words, for the UE configured for a specific TM, only some DCI format(s) corresponding to the specific TM rather than all DCI formats may be used. For example, the UE is semi-statically configured by higher layers so as to receive PDSCH data signaled through a PDCCH according to one of a plurality of predefined TMs. To maintain operation load of the UE according to blind decoding attempt at a predetermined level or less, all DCI formats are not always simultaneously searched by the U.

Figure 5:
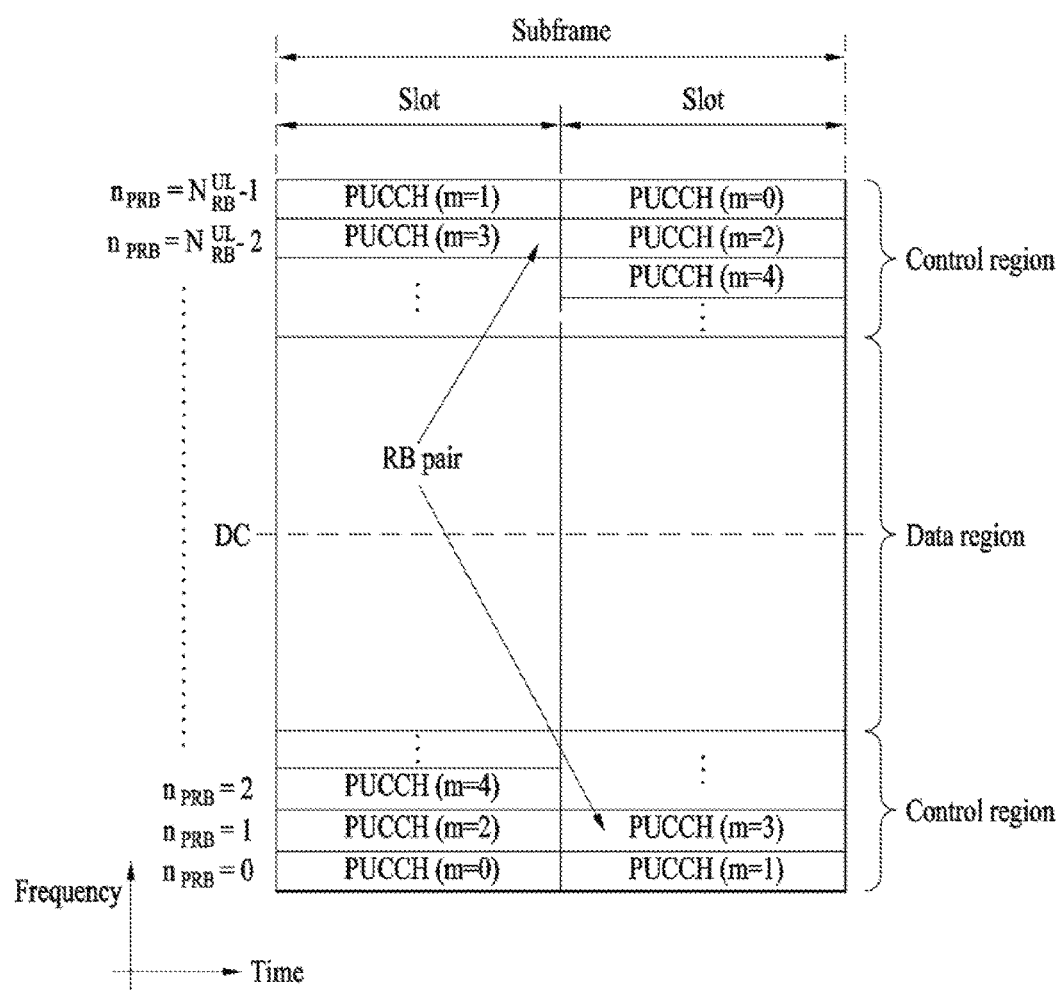
FIG. 5 illustrates the structure of a uplink (UL) subframe used in a wireless communication system.

FIG. 5 illustrates the structure of a UL subframe used in a wireless communication system.

Referring to FIG. 5, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, multiple input multiple output (MIMO)-related feedback information includes the RI and the PMI. The RI indicates the number of streams or the number of layers that the UE can receive through the same time-frequency resource. The PMI is a value reflecting a space characteristic of a channel, indicating an index of a precoding matrix preferred by a UE for DL signal transmission based on a metric such as an SINR. The CQI is a value of channel strength, indicating a received SINR that can be obtained by the UE generally when an eNB uses the PMI.

Figure 6:
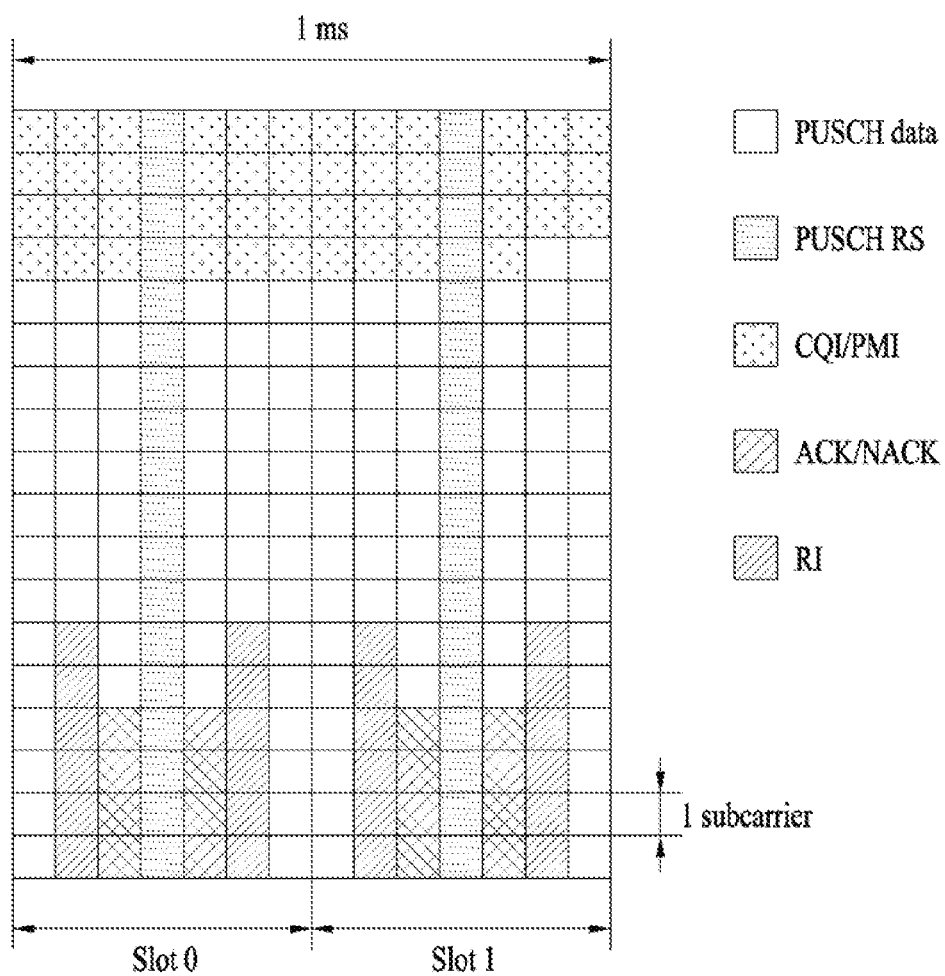
FIG. 6 illustrates multiplexing of uplink control information (UCI) and uplink (UL) data in a physical uplink shared channel (PUSCH) region.

FIG. 6 illustrates multiplexing of uplink control information (UCI) and uplink (UL) data in a PUSCH region.

UL data may be transmitted through a PUSCH in a data region of a UL subframe. A DM RS, which is an RS signal used to demodulate the UL data, may be transmitted together with the UL data in a data region of the UL subframe. Hereinafter, a control region and a data region in the UL subframe will be referred to as a PUCCH region and a PUSCH region, respectively.

If UCI needs to be transmitted in a subframe to which PUSCH transmission is allocated, the UE multiplexes the UCI and UL data (hereinafter, PUSCH data) prior to DFT-spreading and transmits the multiplexed UL signal on a PUSCH, unless simultaneous transmission of a PUSCH and PUCCH is permitted. The UCI includes at least one of CQI/PMI, HARQ ACK/NACK, and RI. The number of REs used for CQI/PMI, ACK/NACK, and RI transmission is based on a modulation and coding scheme (MCS) allocated for PUSCH transmission and on offset values $\Delta^{CQI}_{offset}$, $\Delta^{HARQ-ACK}_{offset}$, and $\Delta^{RI}_{offset}$. The offset values permit different coding rates according to UCI and are semi-statically configured by higher-layer (e.g. radio resource control (RRC) signaling. The PUSCH data and UCI are not be mapped to the same RE. The UCI is mapped to both slots of a subframe.

Referring to FIG. 6, CQI and/or PMI (CQI/PMI) resources are located at the start part of PUSCH data resources. The CQI/PMI resources are sequentially mapped to all SC-FDMA symbols on one subcarrier and then are mapped on the next subcarrier. The CQI/PMI resources are mapped starting from left to right, that is, in the direction of ascending SC-FDMA symbol index, within a subcarrier. The PUSCH data is rate-matched in consideration of the amount of the CQI/PMI resources (i.e. the number of coded symbols). A modulation order which is the same as the modulation order of UL-SCH data is used for CQI/PMI. ACK/NACK is inserted through puncturing part of SC-FDMA resources to which UL-SCH data is mapped. ACK/NACK is located besides a PUSCH RS which is an RS used to demodulate the PUSCH data and is filled starting bottom to top, that is, in the direction of ascending subcarrier index, within an SC-FDMA symbol. In the case of a normal CP, SC-FDMA symbols for ACK/NACK are located at SC-FDMA symbols #2/#5 in each slot as illustrated in FIG. 6. Irrespective of whether ACK/NACK is actually transmitted in a subframe, a coded RI is located next to the symbol for ACK/NACK.

In 3GPP LTE, UCI may be scheduled to be transmitted on a PUSCH without PUSCH data. ACK/NACK, RI, and CQI/PMI may be multiplexed in a similar way to multiplexing as illustrated in FIG. 6. Channel coding and rate matching for control signaling without the PUSCH data are identical to channel coding and rate matching for control signaling with the PUSCH data.

In FIG. 6, the PUSCH RS may be used to demodulate the UCI and/or the PUSCH data transmitted in a PUSCH region. In the present invention, a UL RS associated with PUCCH transmission and a PUSCH RS associated with PUSCH transmission are referred to as a DM RS.

Meanwhile, although not shown in FIG. 6, a sounding reference signal (SRS) may be allocated to a PUSCH region. The SRS is a UL RS not associated with PUSCH or PUCCH transmission. The SRS is transmitted on an OFDM symbol which is located at the last part of a UL subframe in the time domain and on a data transmission band of the UL subframe, that is, on the PUSCH region, in the frequency domain. The eNB may measure a UL channel state between the UE and the eNB using the SRS. SRSs of multiple UEs transmitted/received on the last OFDM symbol of the same subframe may be distinguished according to a frequency location/sequence.

For SRS transmission, subframe(s), bandwidth, a frequency location, a duration, and a cyclic shift value applied to an SRS sequence may be configured by a higher layer.

Since the UL RS, the PUSCH RS, and the SRS are UE-specifically generated by a specific UE and are transmitted to the eNB, the UL RS, the PUSCH RS, and the SRS may be called UL UE-specific RSs.

Figure 7:
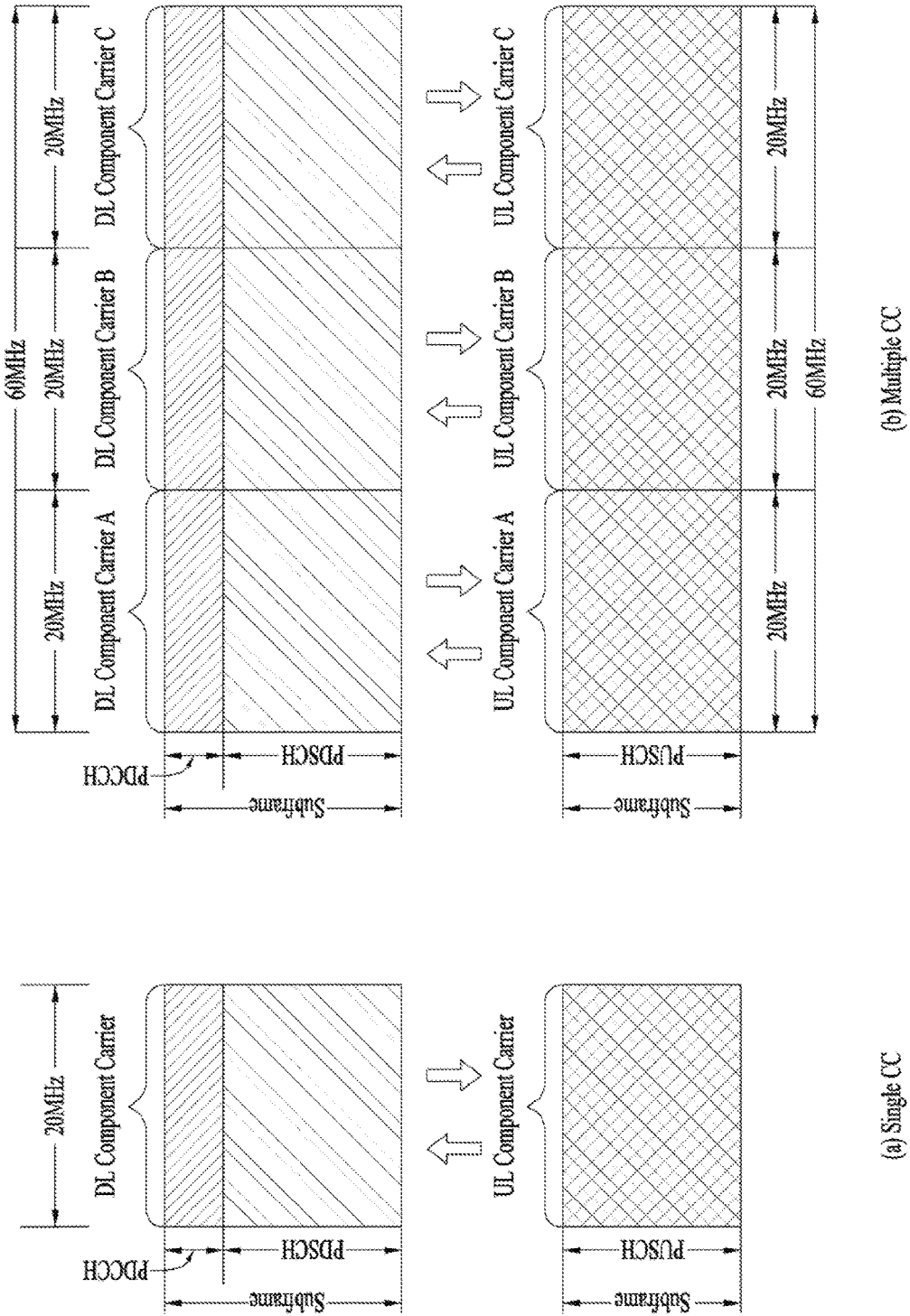
FIG. 7 is a diagram for explaining single-carrier communication and multi-carrier communication.

FIG. 7 is a diagram for explaining single-carrier communication and multi-carrier communication. Specially, FIG. 7(a) illustrates a subframe structure of a single carrier and FIG. 7(b) illustrates a subframe structure of multiple carriers.

Referring to FIG. 7(a), a general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC). Referring to FIG. 7(b), three 20 MHz CCs in each of UL and DL are aggregated to support a BW of 60 MHz. The CCs may be contiguous or non-contiguous in the frequency domain. Although FIG. 7(b) illustrates that a BW of UL CC and a BW of DL CC are the same and are symmetrical, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

In the meantime, the 3GPP LTE-A system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is full reconfigured will be referred to as Pcell, and a cell which may be activated/deactivated freely by the eNB will be referred to as Scell. The Pcell and the Scell may be identified from each other on the basis of the control information. For example, specific control information may be set to be transmitted and received through a specific cell only. This specific cell may be referred to as the Pcell, and the other cell(s) may be referred to as Scell(s).

Figure 8:
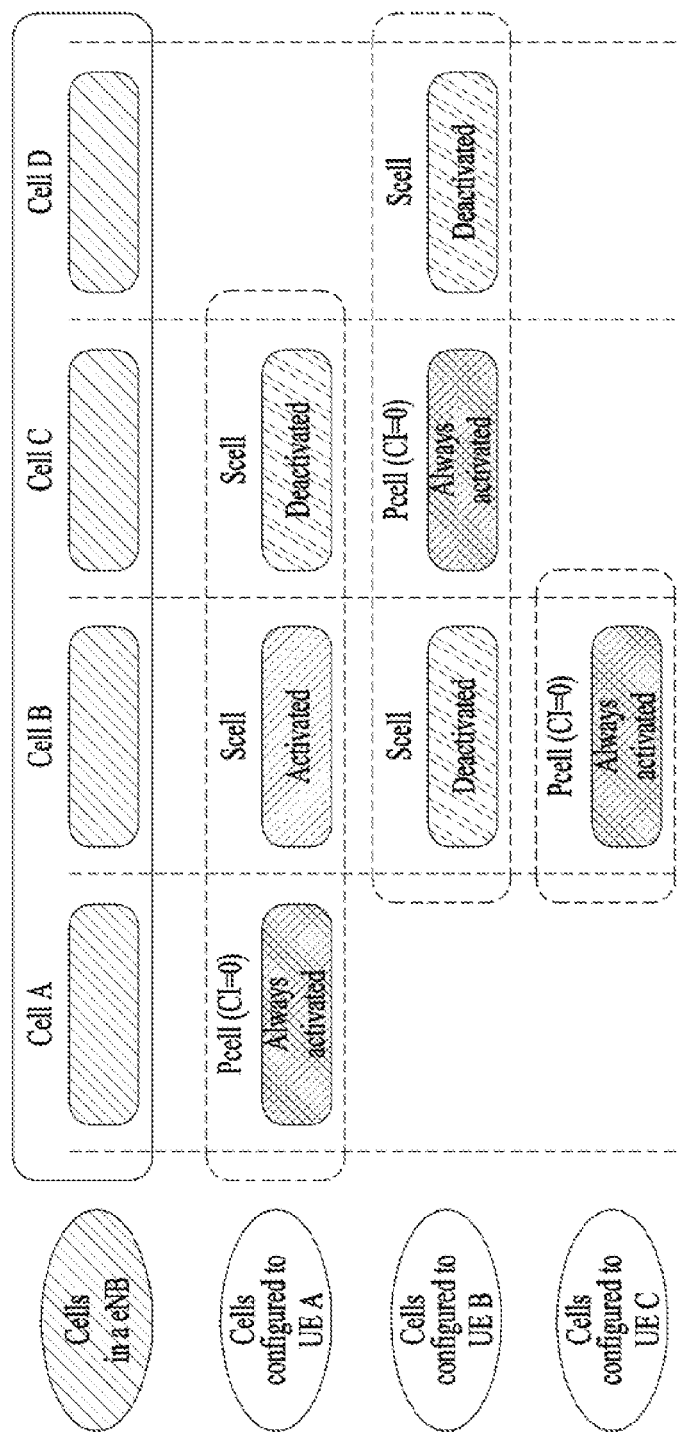
FIG. 8 illustrates the state of cells in a system supporting the carrier aggregation (CA).

FIG. 8 illustrates the state of cells in a system supporting CA.

In FIG. 8, a configured cell refers to a cell in which CA is performed for a UE based on measurement report from another eNB or UE among cells of an eNB and is configured for each UE. The configured cell for the UE may be a serving cell in terms of the UE. The configured cell for the UE, i.e. the serving cell, prereserves resources for ACK/NACK transmission for PDSCH transmission. An activated cell refers to a cell configured to be actually used for PDSCH/PUSCH transmission among configured cells for the UE and CSI reporting and SRS transmission for PDSCH/PUSCH transmission are performed on the activated cell. A deactivated cell refers to a cell configured not to be used for PDSCH/PUSCH transmission by the command of an eNB or the operation of a timer and CSI reporting and SRS transmission are stopped on the deactivated cell. For reference, in FIG. 8, CI denotes a serving cell index and CI=0 is applied to Pcell. The serving cell index is a short ID used to identify the serving cell and, for example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term "cell" used in carrier aggregation is differentiated from the term "cell" indicating a certain geographical area where a communication service is provided by one eNB or one antenna group.

The cell mentioned in the present invention means a cell of carrier aggregation which is combination of UL CC and DL CC unless specifically noted.

Meanwhile, since one serving cell is only present in case of communication based on a single carrier, a PDCCH carrying UL/DL grant and corresponding PUSCH/PDSCH are transmitted on one cell. In other words, in case of FDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on a DL CC linked to the specific UL CC. In case of TDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on the specific CC.

On the contrary, since a plurality of serving cells may be configured in a multi-carrier system, transmission of UL/DL grant through a serving cell having a good channel status may be allowed. In this way, if a cell carrying UL/DL grant which is scheduling information is different from a cell where UL/DL transmission corresponding to the UL/DL grant is performed, this will be referred to as cross-carrier scheduling.

Hereinafter, the case where the cell is scheduled from itself and the case where the cell is scheduled from another cell will be referred to as self-CC scheduling and cross-CC scheduling, respectively.

FIG. 9 illustrates the concept of a small cell.

In CA for existing systems, when a plurality of CCs is aggregated and used, data transmission and acquisition of a cell ID, transmission of system information, and transmission of a physical control signal are allowed, and thus there exists a PCC capable of accessing a stand-alone CC and transmitting/receiving a control signal and data. When an SCC which is capable of transmitting/receiving data only when CCs are aggregated with the PCC is configured, it is assumed that UL/DL frame time synchronization with the SCC is consistent with time synchronization of the PCC on the assumption that that CCs not far apart from each other in the frequency domain are aggregated. Further, the existing LTE/LTE-A system considers only a situation in which the aggregated CCs are used by one node, center frequencies neighbors each other, and thus the frequency properties are similar to each other.

However, the CCs configured for the UE may be used by multiple nodes spaced more than a certain distance from each other, and the center frequencies may be spaced apart from each other by an interval greater than a certain level. Accordingly, frequency aggregation of inter-frequencies having different frequency properties may also be considered. When different nodes participate in CA using different CCs or the same CC, namely when different cells participate in CA using the same CC or different CCs, the aggregated CC(s) may be connected by an ideal backhaul or a non-ideal backhaul. The ideal backhaul refers to a backhaul having a very high throughput and a very low delay such as a dedicated point-to-point connection by means of an optical fiber or an LOS (line of sight) microwave. On the other hand, the non-ideal backhaul refers to a typical backhaul such as xDSL (digital subscriber line) and NLOS (non line of sight) microwave which are commercially widely used. With the ideal backhaul, it may be presumed that there is no delay in exchanging information between cells or nodes.

Meanwhile, introduction of a small cell whose size, namely the coverage of the node or CC is smaller than that of the existing cell is under consideration. An existing cell having a wider coverage than the small cell is called a macro cell. The small cell provides services in coverage narrower than the service coverage of the existing cell due to properties thereof including power and frequency. Since the small cell, which uses a node of low power, can be readily disposed at indoor and outdoor hotspots, it is useful when communication traffic soars. Herein, the node of low power generally refers to a node having transmit power lower than the transmit powers of a macro node and a typical eNB. For example, a pico eNB and a femto eNB may be used as low power nodes. When a UE with low mobility requires high throughput, efficiency of data transmission may be increased if the UE uses the small cell.

The small cell may be used as a PCC of a specific UE, or used only as the SCC. Multiple small cells may be established to form a cluster, or multiple small cells and a macro cell may be established together. A small cell cluster formed by a set of multiple small cells may be present within the coverage of the macro cell, or may be independently present out of the coverage of the macro cell.

In a scenario of dense small cells, a UE may be connected to an overlaid macro cell and the small cells may have the possibility of being used for data offloading. In this case, the UE may discover as many cells as possible within a communication range. Then, it is preferable that the overlaid macro layer choose a best cell in consideration of "loading" information as well as other information. That is, the best cell for data offloading may not be a best cell selected based on reference signal received power (RSRP) and/or reference signal received quality (RSRQ). Rather, a cell having low loading or many users may be desirable as the best cell in terms of overall cell management. Therefore, an advanced discovery procedure is considered to detect more cells than cells detected according to a conventional mechanism.

Hereinafter, a reference signal used for the advanced discovery procedure will be referred to as a discovery reference signal (DRS).

The DRS may have the following characteristics. That is, the DRS:

(1) detects more cells than cells detected based on a legacy PSS/SSS/CRS;

(2) detects cells within a short time as in a subframe;

(3) performs measurement within a short time as in a subframe; and (4) supports measurement necessary for a fast time scale on/off operation.

The present invention considers a few candidates that can be considered for an advanced discovery algorithm as follows.

(a) The DRS is a PSS/SSS/CSI-RS/CRS or a configurable PSS/SSS/CRS;

(b) The DRS is a PSS/SSS/CRS;

(c) The DRS is a PSS/SSS/CSI-RS; and (d) The DRS is a PSS/SSS/CSI-RS/CRS or a configurable PSS/SSS/CSI-RS.

While the present invention considers the DRS configured in the above four types, embodiments of the present invention may be applied even when the DRS is configured in types other than the above types.

It is expected that the DRS will have to be used for coarse time/frequency tracking, measurement, and (if necessary) QCL. When taking into consideration some objectives, the DRS needs to satisfy the following requirements:

(1) The DRS should support coarse time synchronization with an assumption of a significantly great initial timing error (such as ±2.5 ms);

(2) The DRS should support coarse frequency synchronization with an assumption of a significantly great initial frequency error (such as 20 kHz);

(3) The DRS should support detectability of at least three cells (or transmission points); and (4) The DRS should support sufficient measurement accuracy.

To support the requirements of (1) and/or (2), it may be assumed that a PSS and/or an SSS can be transmitted.

For easy configuration, periodicity of DRSs may be considered together with the following constraints:

(1) A multiple of a measurement gap period, for example, 40 ms, 80 ms, 160 ms, or 320 ms (if a new measurement gap period is configured, multiples of such a new period may also be considered);

(2) Alignment with a DRX cycle, for example, 10, 20, 32, 40, 64, 80, 128, 160, 256, 320, 512, 640, 1024, 1280, 2048, or 2560 (This constraint may be eliminated if the UE can perform measurement for a serving cell using legacy signals); and (3) If a PSS/SSS is transmitted in the DRS, the periodicity of the DRS may be a multiple of 5 ms so that the PSS/SSS transmitted for the DRS may be replaced by a PSS/SSS transmitted in an on-state. If the DRS is not transmitted in an on-state, this constraint may be eliminated. Alternatively, in order to avoid the impact on a legacy UE, another periodicity which is not aligned with a PSS/SSS may be considered such that the PSS/SSS may be transmitted in an on-state while an additional PSS/SSS may also be transmitted for DRS transmission. Hereinafter, a PSS and an SSS transmitted as a DRS will be referred to as a DRS-PSS and a DRS-SSS, respectively. If the DRS-PSS and the DRS-SSS are additionally transmitted separately from the PSS/SSS transmitted in an on-state, a cell ID of the DRS-PSS/DRS-SSS may be different from a cell ID of the PSS/SSS.

In the present invention, a DRS-PSS, a DRS-SSS, a DRS-CRS, a DRS-CSI-RS, and a DRS-PRS represent a PSS, an SSS, a CRS, a CSI-RS, and a PRS constituting a DRS, respectively.

If a DRS that a specific cell will transmit in the long term is transmitted in the above-described types of (a) to (d), sequences and resources of a DRS-PSS, a DRS-SSS, a DRS-CRS, and a DRS-CSI-RS may be configured as similarly as possible to a legacy PSS, SSS, CRS, and CSI-RS but the DRS-PSS, the DRS-SSS, the DRS-CRS, and the DRS-CSI-RS may be transmitted with different scrambling initialization parameter(s) and/or different resource locations (e.g. different frequency/time resources) from the legacy PSS, SSS, CRS, and CSI-RS. More characteristically, the DRS-CSI-RS may use a resource pattern of the legacy CSI-RS but use a transmission subframe and period or a scrambling ID different from that of the legacy CSI-RS. That is, a scrambling ID, the number of antenna ports, and a transmission period/offset of a DRS-CSI-RS that a specific cell transmits may be different from those of a CSI-RS that the specific cell transmits.

As more communication devices demand larger communication capacity, efficient use of a limited frequency band in a future wireless communication system becomes increasingly important. Even in a cellular communication system such as a 3GPP LTE/LTE-A system, a method of using, for traffic offloading, an unlicensed band such as a band of 2.4

GHz used by a legacy Wi-Fi system or an unlicensed band such as a band of 5 GHz, which is newly in the spotlight, is under consideration.

Basically, since the unlicensed band is based on wireless transmission/reception through contention between communication nodes, it is necessary for each communication node to confirm that other communication nodes do not perform signal transmission by performing channel sensing before signal transmission. This procedure is called clear channel assessment (CCA). Even an eNB or a UE of the LTE system needs to perform CCA for signal transmission in the unlicensed band (hereinafter, referred to as an LTE-U band). While the eNB or the UE of the LTE system transmits a signal, other communication nodes such as a Wi-Fi node should not create interference by performing CCA. For example, in Wi-Fi standards (e.g. 801.11ac), a CCA threshold is specified as −62 dBm with respect to a non-Wi-Fi signal and as −82 dBm with respect to a Wi-Fi signal, which means that an STA or an AP does not perform signal transmission so as not to create interference when a signal other than the Wi-Fi signal is received at a power of −62 dBm or more. Characteristically, in a Wi-Fi system, the STA or the AP may perform CCA and perform signal transmission, unless signals greater than the CCA threshold are detected for 4 μs or more.

In the present invention, for convenience of description, an eNB and a UE of the 3GPP LTE/LTE-A system are referred to as an eNB and a UE, respectively, and an eNB and a UE of the WLAN system are referred to as an AP and an STA, respectively.

There are various systems used in the LTE-U band. In particular, a system, which will most significantly affect the LTE-A system and will be influenced by the LTE-A system when the LTE-A system is used in the LTE-U band, is an IEEE 802.11 WLAN system. The basic operation scheme of the WLAN system is based on carrier sensing of Carrier Sense Medium Access/Collision Avoidance (CSMA/CA). The WLAN system mandates that all STAs including an AP perform carrier sensing of such a scheme.

Prior to description of embodiments of the present invention, an IEEE 802.11 system will be described in detail as an example of a CSMA based system to which the embodiments of the present invention are applicable. Although the IEEE 802.11 system is described as an example of the CSMA based system for convenience, the embodiments of the present invention may be applied to other CSMA based systems.

Figure 10:
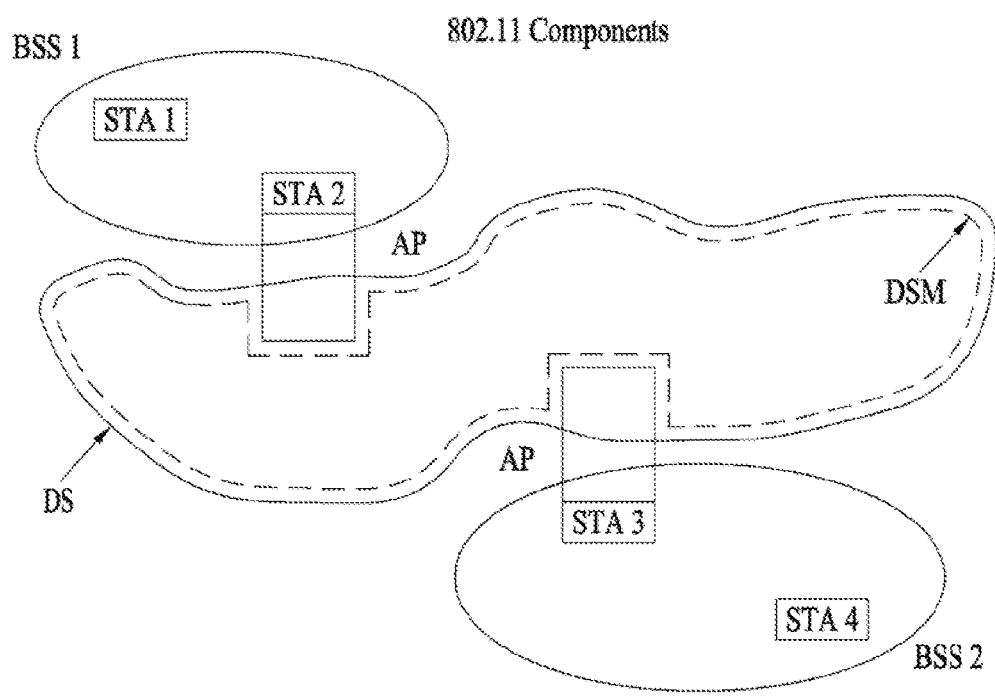
FIG. 10 is a diagram illustrating an IEEE 802.11 system to which the present invention is applicable.

FIG. 10 is a diagram illustrating an exemplary structure of an IEEE 802.11 system to which the present invention is applicable.

The structure of the IEEE 802.11 system may be configured by a plurality of components and may provide a WLAN that supports station (STA) mobility transparent for higher layers according to interaction of the components. In a WLAN system, an STA is a device operating according to MAC/PHY specifications of IEEE 802.11. The STA includes an AP STA and a non-AP STA. The non-AP STA corresponds to a device that a user generally handles in person, such as a laptop computer or a mobile phone.

The non-AP STA may be referred to as a terminal, a wireless transmit/receive unit (WTRU), a user equipment (UE), a mobile station (MS), a mobile terminal (MT), a mobile subscriber station (MSS), etc. The AP may correspond to a base station (BS), a Node-B, an evolved Node-B (eNB), a base transceiver system (BTS), a femto BS, a pico BS, etc. in other wireless communication fields.

Referring to FIG. 10, a basic service set (BSS) may correspond to a basic component block in an IEEE 802.11 LAN. An ellipse that defines a BSS in FIG. 9 may indicate a coverage area in which STAs belonging to the corresponding BSS maintain communication. This area may be referred to as a basic service area (BSA). If an STA moves out of the BSA, the STA cannot directly communicate with other STAs in the BSA.

The most basic type of BSS in the IEEE 802.11 LAN is an independent BSS (IBSS). For example, the IBSS may have a minimum configuration including only two STAs. This configuration is possible when STAs can directly communicate with each other. This type of LAN may be configured as necessary rather than being pre-designed and configured and may be called an ad-hoc network.

When an STA is turned on or off, or enters or leaves the coverage of a BSS, membership of STAs in the BSS may be dynamically changed. To become a member of the BSS, an STA may join the BSS using a synchronization procedure. To access all services based on the BSS, an STA needs to be associated with the BSS. Such association may be dynamically configured and may use a distribution system service (DSS).

In a LAN, a direct STA-to-STA distance may be limited by physical (hereinafter, PHY) layer performance. While this distance limit may be sufficient in some cases, communication between STAs having a longer distance therebetween may be needed in other cases. To support an extended coverage, a distribution system (DS) may be configured.

The DS refers to a structure in which BSSs are connected to each other. Specifically, BSSs may be present as components of an extended form of a network composed of a plurality of BSSs rather than being independently present.

The DS is a logical concept and may be specified by characteristics of a distribution system medium (DSM). In IEEE 802.11 standards, a wireless medium (WM) and the DSM are logically discriminated. These logical media are used by different components for different purposes. In definition of IEEE 802.11 standards, the media are not limited as the same medium or different media. The fact that plural media are logically different from each other may explain flexibility of an IEEE 802.11 LAN structure (a DS structure or other network structures). That is, the IEEE 802.11 LAN structure may be implemented in various manners and may be independently specified by physical characteristics of implementations thereof.

The DS may support mobile devices by providing seamless integration of a plurality of BSSs and providing logical services necessary to handle addresses to a destination.

The AP (i.e. an AP STA) refers to an entity that enables associated STAs to access the DS through the WM and has STA functionality. Data may be transmitted between a BSS and the DS through the AP. For example, STA2 and STA3 shown in FIG. 9 have STA functionality and provide a function of enabling associated STAs (STA1 and STA4) to access the DS. In addition, all APs are addressable entities because they basically correspond to STAs. An address used by an AP for communication on the WM does not necessarily need to be equal to an address used by the AP for communication on the DSM.

Data transmitted from one of STAs associated with an AP to an STA address of the AP may be received at an uncontrolled port at all times and processed by an IEEE 802.1X port access entity. In addition, the transmitted data (or frame) may be delivered to the DS when a controlled port is authenticated.

In a WLAN system based on IEEE 802.11, a basic access mechanism of MAC is a CSMA/CA mechanism. The CSMA/CA mechanism is also called a distributed coordination function (DCF) of IEEE 802.11 MAC and basically adopts an access mechanism of "listen before talk" (hereinafter, LBT). According to this type of access mechanism, an AP and/or an STA may perform CCA for sensing a radio channel or a medium for a predetermined time duration (e.g. DCF inter-frame space (DIFS) prior to starting transmission. If it is determined that the medium is in an idle state as a sensing result, the AP and/or the STA starts to transmit a frame through the medium. Meanwhile, if it is sensed that the medium is in an occupied state, the AP and/or the STA may attempt to transmit the frame after waiting a delay duration for medium access (e.g. a random backoff period) without starting transmission thereof. Since it is expected that multiple STAs attempt to perform frame transmission after waiting different times by applying the random backoff period, collision can be minimized.

Figure 11:
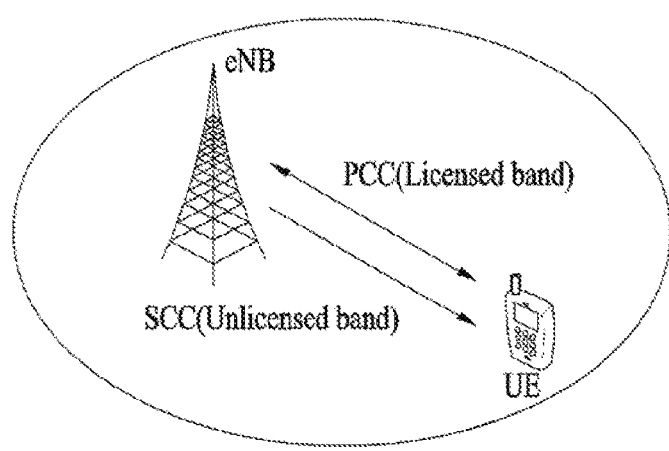
FIG. 11 illustrates a carrier aggregation situation of a 3GPP LTE-A band, which is a licensed band, and an unlicensed band (hereinafter, LTE-U band).

FIG. 11 illustrates a carrier aggregation situation of a 3GPP LTE-A band, which is a licensed band, and an unlicensed band (hereinafter, an LTE-U band).

Referring to FIG. 11, an eNB may transmit a signal to a UE or the UE may transmit a signal to the eNB in the carrier aggregation situation of the LTE-A band and the LTE-U band. In the following description, it is assumed for convenience of description of proposed schemes that the UE is configured to perform wireless communication through two component carriers (CCs) in the LTE-A band and the LTE-U band. As an example, a CC of the LTE-A band may be configured as a PCC and a CC of the LTE-U band may be configured as an SCC. However, the embodiments of the present invention may be extensively applied to a situation in which a plurality of LTE-A bands and a plurality of LTE-U bands are used by a carrier aggregation scheme or may be applied even when signal transmission/reception between the eNB and the UE is performed only in the LTE-U band. In addition, the embodiments of the present invention may be extensively applied not only to the 3GPP LTE/LTE-A system but also to systems having other characteristics.

Hereinafter, for convenience of description, a cell, which is configured on an LTE-U band operating according to an LTE-U scheme and operates according to the LTE-U scheme, will be referred to as a Ucell or an LTE-U cell, and a normal cell other than the Ucell, for example, a cell, which is configured on a licensed band for 3GPP LTE/LTE-A and operates according to a 3GPP LTE/LTE-A scheme, will be referred to an Lcell or a non-Ucell. In addition, a licensed band, which is dedicated to other communication systems including 3GPP LTE/LTE-A, rather than an LTE-U band, will be referred to as a non-LTE-U band.

In order for an eNB and a UE to perform communication in the LTE-U band which is an unlicensed spectrum, the eNB and the UE should occupy/secure the corresponding band for a specific time duration through contention with other communication (e.g. Wi-Fi) systems which are not associated with the LTE/LTE-A system. Hereinafter, the time duration occupied/secured for communication in the LTE-U band will be referred to as a reserved resource period (RRP), for convenience. To secure the RRP, various methods may be used. Typically, there may be a method of transmitting a specific reservation signal so that other communication system devices such as a Wi-Fi device may recognize that a corresponding radio channel is busy or continuously transmitting an RS and/or a data signal so that a signal of a specific power level or more may be seamlessly transmitted during the RRP.

The RRP may be configured based on carrier sensing performed by the eNB. If the eNB has determined the RRP during which the eNB desires to occupy the LTE-U band in advance, the eNB may pre-inform the UE of the RRP so that the UE may maintain a communication transmission/reception link during the indicated RRP. As a scheme of informing the UE of information about the RRP, the eNB may transmit the information about the RRP through another CC (e.g. the LTE-A band) connected in the form of carrier aggregation.

An entity for determining the RRP may differ according to whether transmission is performed on DL or UL. For example, the RRP for DL transmission (hereinafter, a DL RRP) may be determined by the eNB based on carrier sensing performed by the eNB. The RRP for UL transmission (a UL RRP) may be determined by the eNB based on carrier sensing performed by the eNB and then indicated to the UE. Alternatively, the UE may confirm or determine the UL RRP in units of subframes by confirming a channel state, i.e. through carrier sensing performed by the UE, prior to signal transmission.

On a cell used for legacy carrier aggregation, i.e. on an Lcell, an RS for channel synchronization or an RS for channel measurement, such as a PSS/SSS/PBCH, a CRS, and/or a CSI-RS, appears periodically and continuously. In contrast, on a Ucell, the eNB may configure the RRP only when the Ucell is in an idle state and transmit the RS for channel measurement in the RRP. Therefore, the synchronization/measurement RSs will appear aperiodically and/or discontinuously on the Ucell.

Meanwhile, on the Lcell, although the UE is configured to detect the RS(s) or perform synchronization or measurement using the RS(s) for a time duration while the Lcell is activated, the RS(s) may be transmitted for a time duration while the Lcell is inactivated. The synchronization/measurement RS(s) are continuously transmitted regardless of activation or inactivation of the Lcell but the UE is configured to detect the synchronization/measurement RSs only for a time duration during which the Lcell is activated. Unlike this, on the Ucell, the eNB transmits the synchronization or measurement RS(s) only during the RRP and, in principle, does not transmit synchronization or measurement RS(s) during a non-RRP because a wireless communication medium is occupied by other devices during the non-RRP.

As another example of an operation in the LTE-U band which operates by a contention-based random access scheme, the eNB may first perform carrier sensing (CS) before transmitting/receiving data. The eNB may check whether a current channel state of an SCell is busy or idle. If it is determined that the current channel state is idle, the eNB may transmit a scheduling grant through a (E)PDCCH of a PCell (i.e. through cross carrier scheduling (CCS)) or through a PDCCH of the SCell and attempt to transmit/receive data.

In order for the eNB and the UE to perform communication in the LTE-U band which is an unlicensed spectrum, the eNB and the UE should occupy/secure the LTE-U band for a specific time period through contention with other communication (e.g. Wi-Fi) systems which are not associated with LTE. Hereinafter, the time period occupied/secured for communication in the LTE-U band will be referred to as a reserved resource period (RRP), for convenience.

FIG. 12 illustrates a subframe configuration of an RRP.

The RRP may be configured such that boundaries of subframe(s) constituting the RRP are aligned with boundaries of subframe(s) configured on a Pcell, as illustrated in FIG. 12(a), or such that the boundaries of the subframe(s) constituting the RRP are misaligned with the boundaries of the subframe(s) configured on the Pcell, as illustrated in FIG. 12(b).

As illustrated in FIG. 12(a), the RRP configured such that subframe boundaries and subframe numbers/indexes on a Ucell are aligned with those on the Pcell is referred to as an aligned-RRP and, as illustrated in FIG. 12(b), the RRP configured such that subframe boundaries and subframe numbers/indexes on the Ucell are misaligned with those on the Pcell is referred to as a floating-RRP. In the embodiments of the present invention, the meaning of aligning subframe boundaries between cells with each other is that an interval between subframe boundaries of two different cells is less than a specific time (e.g. CP length or X μs where X≥0).

To secure the RRP, various methods may be used. Typically, there may be a method of transmitting a specific reservation signal so that other communication system devices such as a Wi-Fi device may recognize that a corresponding radio channel is busy or continuously transmitting an RS and a data signal so that a signal of a specific power level or more may be seamlessly transmitted during the RRP. Thus, if the eNB has determined the RRP during which the eNB desires to occupy the LTE-U band in advance, the eNB may pre-inform the UE of the RRP so that the UE may maintain a communication transmission/reception link during the indicated RRP. As a scheme of informing the UE of information about the RRP, the eNB may transmit the information about the RRP through another CC (e.g. the LTE-A band) connected in the form of carrier aggregation.

If a specific Ucell is completely out of synchronization with a serving cell of the UE, the UE needs to perform time/frequency synchronization with respect to the Ucell in order to receive data from the Ucell (i.e. on the Ucell) or to measure the Ucell. However, in an LTE-U band, a transmission device needs to perform CCA for transmitting a signal based on contention with a non-LTE-A system. In this case, it may be impossible for a PSS/SSS to be transmitted at a period of 5 ms as illustrated in FIG. 3.

Therefore, in an LTE-U environment, it is necessary to design a synchronization signal having a form/transmission timing different from a legacy form/transmission timing. In this case, in the LTE-U environment in which signals/frames are transmitted through contention in a burst form, there is a high probability that the synchronization signal is desirably transmitted in a preamble form before data is transmitted.

The present invention proposes that signals for synchronization, measurement, etc. be transmitted in a preamble form in the LTE-U environment. In addition, the present invention proposes a possible preamble transmission structure in the above case. The present invention also proposes considerations when measurement is performed through such a preamble.

While the present invention is described mainly under the assumption that signals for synchronization, measurement, etc. are transmitted in the preamble form, it is apparent that the present invention may be applied even when the signals for synchronization, measurement, etc. are transmitted during transmission of a frame or the signals are independently transmitted. An LTE-U preamble described in the present invention may mean indicating a synchronization signal and a discovery signal (DRS) in the LTE-U environment.

<A. Possible Roles of LTE-U Preamble>

First, possible roles of the LTE-U preamble proposed in the present invention will now be described.

Channel Reservation

In order to transmit an LTE frame or data to a UE in an LTE-U environment, an eNB should occupy a channel through contention with other devices, such as CCA/LBT. In this case, a channel occupied timing by an eNB/LTE-U device may not be aligned with a subframe boundary or an OFDM symbol boundary. Then, the channel occupied timing may be different from a timing at which transmission of the LTE frame or data can actually be started. In this case, in order to prevent other devices from determining that a channel is idle and using the channel during a timing gap generated until the LTE frame or data is actually transmitted after the eNB/LTE-U device occupies the channel, a signal for channel reservation may be transmitted during the timing gap.

FIG. 13 illustrates examples of LTE-U preamble transmission that can be performed in embodiments of the present invention.

In the embodiments of the present invention, the meaning of "the eNB/LTE-U device transmits an LTE-U preamble through a contention scheme" may include a procedure of transmitting a signal for channel reservation during a timing gap until the LTE-U preamble is actually transmitted after the eNB/LTE-U device occupies a channel as illustrated in FIG. 13(a). Alternatively, the LTE-U preamble may include a channel reservation signal transmitted during this timing gap as illustrated in FIG. 13(b).

In the embodiments of the present invention, the LTE-U preamble may serve to cause another eNB or UE to be aware that an eNB of a specific cell has occupied a channel on a Ucell by receiving the LTE-U preamble.

The LTE-U preamble may be transmitted by a UE. For example, the UE may transmit the LTE-U preamble prior to transmitting UL data. In order to prevent other devices from determining that a channel is idle and using the channel during a timing gap generated until the LTE frame or data is actually transmitted after the UE occupies the channel, the channel reservation signal may be transmitted during the timing gap.

(Time/Frequency) Synchronization

The LTE-U preamble has a structure in which it is favorable for the UE to perform time/frequency synchronization with a cell that transmits the LTE-U preamble so that the UE may perform (time/frequency) synchronization with an LTE-U cell that transmits the LTE-U preamble. The LTE-U preamble may have a form of repeatedly transmitting a legacy PSS and/or SSS (PS/SSS) or a form of modifying the PSS/SSS.

The UE may transmit the LTE-U preamble. For example, the UE may transmit the LTE-U preamble for the purpose of synchronization prior to UL data transmission. The eNB may perform synchronization for receiving data transmitted by the UE using the LTE-U preamble transmitted by the UE.

Cell Detection

The LTE-U preamble may be designed depending upon a physical cell ID or a virtual cell ID of the LTE-U cell that transmits the LTE-U preamble. Accordingly, the UE may determine the physical cell ID or virtual cell ID of the LTE-U cell that transmits the LTE-U preamble by receiving the LTE-U preamble.

Intra/Inter-Cell Measurement

The UE may identify information about a timing at which a signal for measurement of a specific cell is transmitted by performing intra/inter-cell measurement using the LTE-U preamble or performing synchronization with the specific cell and cell detection through the LTE-U preamble.

Detection of LTE-U Signal/Non-LTE-U signal

The UE may determine whether a transmitted signal is an LTE-A signal transmitted by the LTE-U eNB device or a signal transmitted by a device using a non-LTE-A system (e.g. WLAN) by receiving/detecting the LTE-U preamble.

AGC Setting

The LTE-U preamble may also be used for automatic gain control (AGC) setting. A circuit for automatically controlling an output signal for stable reception even when the strength of a propagation signal received by a receiving end varies due to channel fading is called an AGC circuit. The LTE-U preamble may be transmitted by the UE. In this case, the eNB may use the LTE-U preamble to perform AGC for a signal transmitted by the UE.

Embodiments of the present invention described below are proposed under the assumption that the LTE-U preamble is designed to perform the above-described possible roles.

<B. Transmission Timing of LTE-U Preamble>

This section proposes a timing at which the LTE-U preamble is transmitted when the LTE-U preamble that can perform the roles as in Section A is transmitted in an LTE-U environment (by the eNB).

A timing gap may be present until the LTE-U preamble is actually transmitted after the eNB/LTE-U device occupies a channel. In order to prevent other devices from determining that the channel is idle and using the channel during this timing gap, a signal for channel reservation may be transmitted during the timing gap. In this case, the meaning of "the eNB/LTE-U device transmits the LTE-U preamble through a contention scheme" may include a procedure of transmitting the channel reservation signal during the timing gap until the LTE-U preamble is actually transmitted after the eNB/LTE-U device occupies a channel. Alternatively, the LTE-U preamble may include a structure having a channel reservation signal transmitted during this timing gap.

FIG. 14 to FIG. 18 illustrate embodiments of the present invention regarding a transmission timing of an LTE-U preamble.

Figure 14:
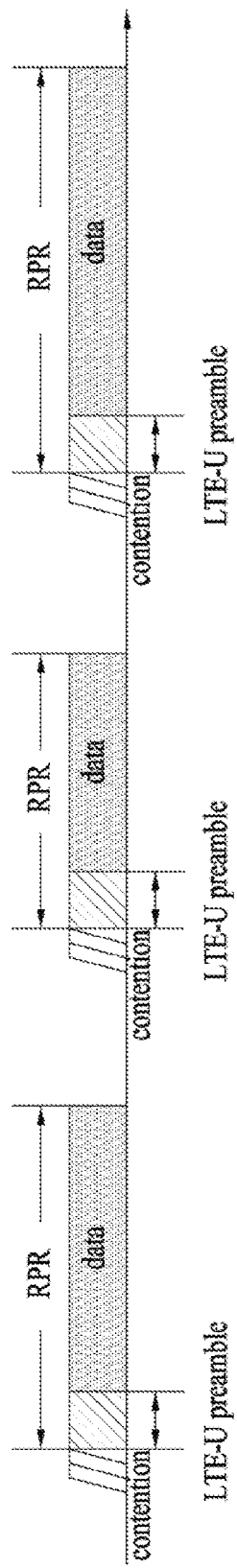
FIG. 14 to FIG. 18 illustrate embodiments of the present invention regarding a transmission timing of an LTE-U preamble.

Embodiment B-A. LTE-U Preamble is Located at the Foremost Part of LTE Frame (Data) Transmission Duration Upon determining that a channel is idle through a scheme such as CCA/LBT, the eNB/LTE-U device may transmit an LTE-U frame or data. In this case, the eNB/LTE-U device may transmit the LTE-U preamble at the foremost part of the LTE-U frame or the data prior to transmission of the LTE-U frame or data as illustrated in FIG. 14.

In other words, upon determining that a channel is idle through a scheme such as CCA/LBT, the eNB/LTE-U device may transmit the LTE-U preamble first and then transmit the LTE-U frame or data. Alternatively, upon determining that a channel is idle through a scheme such as CCA/LBT, the eNB/LTE-U device may transmit the LTE-U frame or data wherein the LTE-U preamble may be located at the foremost part of the LTE-U frame.

This transmission structure may be explained as follows. Upon determining that a channel is idle through a scheme such as CCA/LBT, the eNB/LTE-U device may assume that resources can be secured during an RRP. In this case, the LTE-U preamble may be located at the foremost part of every RRP that the eNB/LTE-U device secures through a scheme such as CCA/LBT.

Meanwhile, although the LTE-U preamble may be transmitted in every RRP that the eNB/LTE-U device secures through a scheme such as CCA/LBT, the LTE-U preamble may be selectively transmitted in only partial RRPs when necessary. Then, the UE needs to be aware of whether the LTE-U preamble is transmitted in a specific RRP. Therefore, the present invention proposes that the eNB/LTE-U device indicate, to the UE through a Pcell or through an Scell located on a licensed (or unlicensed) carrier, whether the LTR-U preamble is transmitted in a specific RRP which is secured through a scheme such as CCA/LBT. For example, the eNB/LTE-U device may indicate whether the LTE-U preamble or a synchronization signal is transmitted, through DCI transmitted through a Pcell or an Scell located on the licensed carrier. Alternatively, the eBN/LTE-U device may indicate whether the LTE-U preamble (or synchronization signal) is transmitted, through DCI transmitted on the unlicensed carrier on which the LTE-U preamble (or synchronization signal) is transmitted. In this case, the DCI may be transmitted in an RRP in which the LTE-U preamble is transmitted.

Embodiment B-B. LTE-U Preamble is Transmitted in First RRP in Given Period

Figure 15:
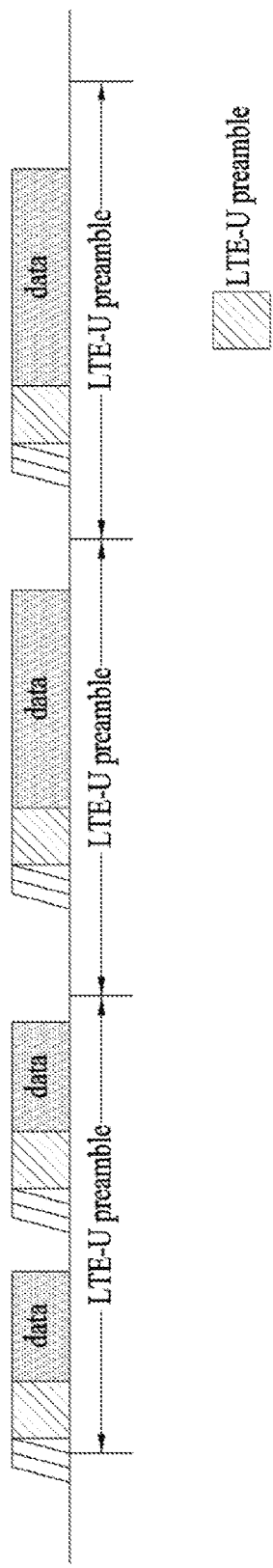
Figure 16:
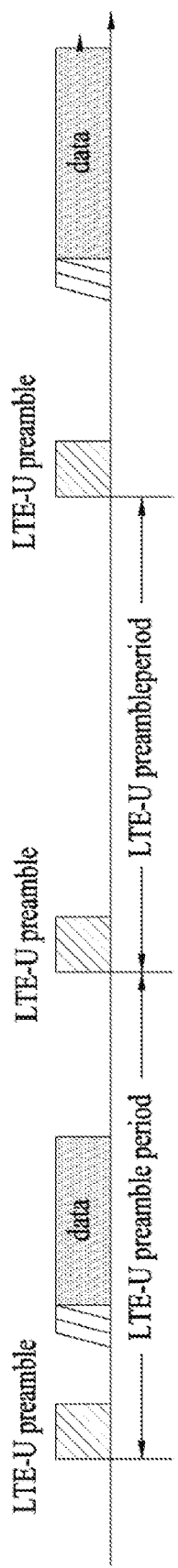

"Upon determining that a channel is idle, through a scheme such as CCA/LBT, and occupying the channel" for the first time in a specific period (e.g. LTE-U preamble period), the eNB/LTE-U device may transmit the LTE-U preamble prior to transmitting the LTE-U frame or data or transmit the LTE-U preamble at the foremost part of the LTE-U frame or data as illustrated in FIG. 15.

In other words, upon determining that a channel is idle through a scheme such as CCA/LBT, the eNB/LTE-U device may transmit the LTE-U preamble first and then transmit the LTE-U frame or data as in Embodiment B-A. Alternatively, upon determining that a channel is idle through a scheme such as CCA/LBT, the eNB/LTE-U device may transmit the LTE-U frame or data wherein the LTE-U preamble may be located at the foremost part of the LTE-U frame. In this case, according to Embodiment B-B, the LTE-U preamble may be transmitted only once in the LTR-U preamble period rather than at every timing at which the eNB/LTE-U device occupies the channel. If the eNB/LTE-U device occupies the channel several times, the LTR-U preamble may be transmitted only when the eNB/LTE-U device occupies the channel for the first time in the period.

This transmission structure may be explained as follows. The LTE-U preamble may be transmitted in the foremost part of an RRP first secured by the eNB/LTE-U device in a specific period (e.g. LTE-U preamble period).

The LTE-U preamble period may be configured through an RRC signal transmitted on a Pcell or an Scell, operating on a licensed carrier. Alternatively, the LTE-U preamble period may be configured through the RRC signal through an unlicensed carrier on which the LTE-U preamble (i.e. synchronization signal) is transmitted.

This can be extended as follows. The LTE-U preamble may be transmitted in one RRP in the LTE-U preamble period. Alternatively, the LTE-U preamble may be transmitted in at least one RRP in the LTE-U preamble period. In this case, information about an RRP in which the LTE-U preamble is transmitted may be indicated by DCI. Alternatively, whether the LTE-U preamble has been transmitted in a corresponding RRP may be indicated by the DCI with respect to every RRP. The DCI may be transmitted through the Pcell or the Scell, operating on a licensed carrier. Alternatively, the DCI may be transmitted through an unlicensed carrier on which the LTE-U preamble (i.e. synchronization signal) is transmitted.

In addition, the LTE-U preamble may be transmitted in a specific period after the LTE-U preamble is transmitted. For example, the LTE-U preamble may be transmitted through one RRP or through one or more RRPs, among RRPs transmitted within 50 ms after the LTE-U preamble is transmitted. In this case, an RRP through which the LTE-U preamble is transmitted may be indicated by the DCI. Alternatively, whether the LTE-U preamble has been transmitted in a corresponding RRP may be indicated by the DCI with respect to every RRP. The DCI may be transmitted through the Pcell or the Scell, operating on a licensed carrier. Alternatively, the DCI may be transmitted through an unlicensed carrier on which the LTE-U preamble (i.e. synchronization signal) is transmitted.

Embodiment B-C. Transmission of Periodic LTE-U Preamble Frame

The LTE-U preamble may be independently transmitted regardless of whether the LTE-U frame or data has actually been transmitted. In this case, the LTE-U preamble may be periodically (e.g. a period of 40 ms) transmitted. Hereinafter, such a transmission period of the LTE-U preamble will be referred to as an LTE-U preamble period. In this case, transmission of the LTE-U preamble may have a form in which:

a) only the LTE-U preamble is transmitted, or b) a short frame (having, for example, a length of one slot or 1 ms) including the LTE-U preamble is transmitted.

For periodic transmission, the LTE-U preamble or the short frame including the LTE-U preamble may be transmitted without contention such as CCA/LBT. Alternatively, referring to FIG. 16, contention such as CCA/LBT may be performed wherein, if a channel is busy at a timing at which the LTE-U preamble should be transmitted, the LTE-U preamble may not be transmitted. In this case, the UE may receive information about the LTE-U preamble period configured by the serving cell and assume that the LTE-U preamble of a specific LTE-U cell is transmitted at a period of the LTE-U preamble period. While contention such as CCA/LBT is performed, if a channel is busy at a timing at which the LTE-U preamble should be transmitted, the LTE-U preamble may not be transmitted. In this case, the UE needs to be aware of whether the LTE-U preamble has actually been transmitted at the transmission timing of a specific LTE-U preamble. Accordingly, an embodiment of the present invention proposes that the eNB/LTE-U device indicate whether the LTE-U preamble is transmitted to the UE through a Pcell or through an Scell located on an unlicensed carrier. Alternatively, whether the LTE-U preamble (i.e. synchronization signal) is transmitted may be indicated by DCI transmitted through an unlicensed carrier on which the LTE-U preamble (i.e. synchronization signal) is transmitted. In this case, the DCI may be transmitted, for example, immediately before/after the LTE-U preamble is transmitted or during the LTE-U preamble period.

Figure 17:
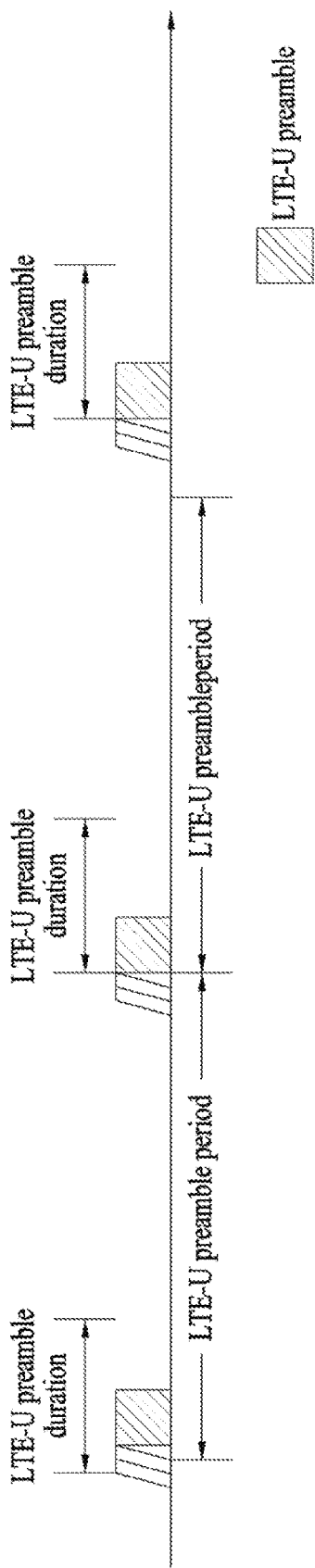

While the LTE-U preamble or the short frame including the LTE-U preamble may be periodically transmitted, such transmission may be performed through contention such as CCA/LBT for coexistence with other non-LTE-A devices. However, when the LTE-U preamble is transmitted through contention, the LTE-U preamble may not be transmitted at a desired timing due to contention loss. In this case, a time duration during which the LTE-U preamble can be transmitted may be extended so as to raise a probability of transmitting the LTE-U preamble. To this end, an embodiment of the present invention proposes that a duration during which the LTE-U preamble can be transmitted (e.g. LTE-U preamble duration) be designated together with a period in which the LTE-U preamble is transmitted (e.g. LTE-U preamble period) as illustrated in FIG. 17. A period, an offset, and a duration in which the LTE-U preamble can be transmitted may be configured through RRC through a Pcell or an Scell, operating on a licensed carrier. In this case, the LTE-U preamble may be transmitted in the LTE-U preamble duration as illustrated in FIG. 17 and the LTE-U preamble duration may be located with a period of the LTE-U preamble period. In this case, the LTE-U preamble may be transmitted at a timing at which transmission can be performed through contention such as CCA/LBT in a specific LTE-U duration. If contention repeatedly fails so that the LTE-U preamble cannot be transmitted in the LTE-U preamble duration, the LTE-U preamble may not be transmitted in the LTE-U preamble duration. Information about the LTE-U preamble period and information about the LTE-U preamble duration may be configured for the UE by the serving cell. Then, the UE may assume that the LTE-U preamble is transmitted in the LTE-U preamble duration with a period of the LTE-U preamble period. Under the assumption that the LTE-U preamble is transmitted in the LTE-U preamble duration, the UE may attempt to detect the LTE-U preamble in the LTE-U preamble duration. Notably, it cannot be assumed that the LTE-U preamble is always transmitted in the LTE-U preamble duration. Accordingly, the UE may fail to detect the LTE-U preamble in the LTE-U preamble duration.

Characteristically, a timing at which the eNB can start transmission of the LTE-U preamble through contention such as CCA/LBT in the LTE-U duration may be 1) an OFDM symbol boundary (timing at which transmission of an OFDM symbol is started), or 2) a subframe boundary (timing at which transmission of a subframe is started).

In this case, the UE needs to be aware of a timing at which the LTE-U preamble has actually been transmitted in the LTE-U preamble duration. Accordingly, an embodiment of the present invention proposes that the eNB indicate information about a timing at which the LTE-U preamble has actually been transmitted to the UE through a Pcell or through an Scell located on a licensed carrier. The eNB may inform the UE of information about an offset between a start timing of the LTE-U preamble duration and a timing location (e.g. OFDM symbol location) at which the LTE-U preamble has actually been transmitted through the Pcell or through the Scell located on the licensed carrier. If the LTE-U preamble has not been transmitted in the LTE-U preamble duration, the eNB may not inform the UE that the LTE-U preamble has not been transmitted, through the Pcell or through the Scell located on the licensed carrier.

As another embodiment for causing the UE to be aware of a timing at which the LTE-U preamble has actually been transmitted in the LTE-U preamble duration, there is a method in which RS configuration of the LTE-U preamble differs according to a transmission timing of the LTE-U preamble. For example, in this embodiment, an RS configuration of the LTE-U preamble may differ according to an offset value between an OFDM symbol index in which transmission of the LTE-U preamble is started or a start timing of the LTE-U preamble duration and an OFDM symbol location at which the LTE-U preamble has actually been transmitted, so that the UE may discern a timing at which the LTE-U preamble is transmitted (OFDM symbol location at which the LTE-U preamble is transmitted). To this end, according to the OFDM symbol location at which the LTE-U preamble is transmitted, the eNB may, for example, 1) vary a v-shift value of the LTE-U preamble, that is, vary a frequency shift degree of the LTE-U preamble, 2) multiply a different random sequence by the LTE-U preamble, 3) vary a root sequence for generating an LTE-U preamble signal, 4) vary the phase of the LTE-U preamble signal (vary a phase shifted degree), or 5) use a different distinguishable sequence as the LTE-U preamble.

Embodiment B-D. LTE-U Preamble is Located in LTE Frame (Data) Transmission Period Upon determining that a channel is idle through a scheme such as CCA/LBT, the eNB/LTE-U device may transmit the LTE-U frame (or data). In this case, the eNB/LTE-U device may transmit the LTE-U preamble (i.e. synchronization signal) between transmission periods of the LTE-U frame or data. The LTE-U preamble may be transmitted only once during the LTE-U frame transmission period (e.g. RRP) or may be transmitted multiple times. For example, the LTE-U preamble may be transmitted with a period of Y ms (or Y subframes) after X ms (or X subframes) from start of LTE-U frame transmission. The offset value X and the period value Y may be fixed to standard values or may be configured by RRC through a Pcell or an Scell transmitted on a licensed carrier. Alternatively, the LTE-U preamble may be transmitted after a predetermined time from start of LTE-U frame transmission. Alternatively, a resource region in which the LTE-U preamble is transmitted may be predetermined and the LTE-U preamble may be transmitted through a resource region in which the LTE-U preamble is transmitted in the transmission period of the LTE-U frame (i.e. data). For example, OFDM symbol #5 and/or OFDM symbol #6 in subframe #0 and/or OFDM symbol #5 and/or OFDM symbol #6 in subframe #5 may be predetermined as a time axis resource for the LTE-U preamble and 6 center PRBs may be predetermined as a frequency axis resource for the LTE-U preamble.

Figure 18:
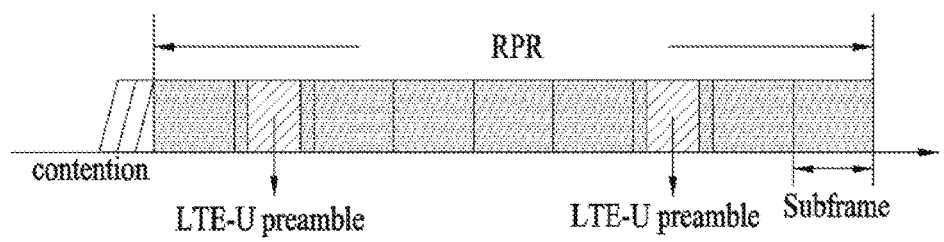
Figure 19:
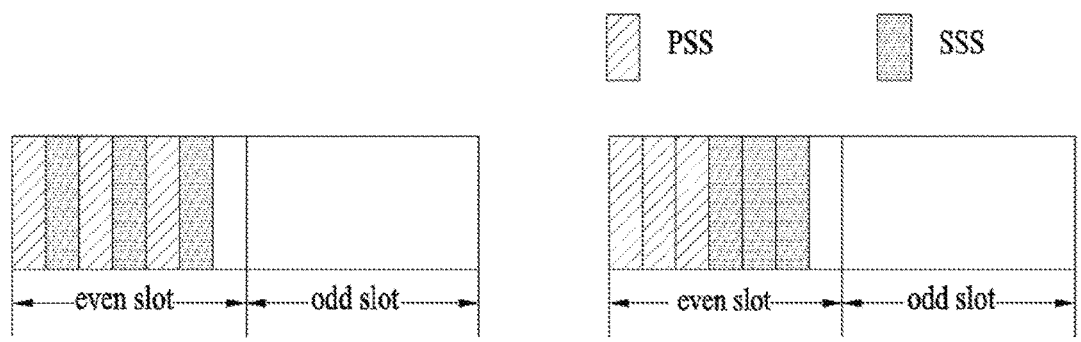
FIG. 19 illustrates an LTE-U preamble according to an embodiment of the present invention.
Figure 20:
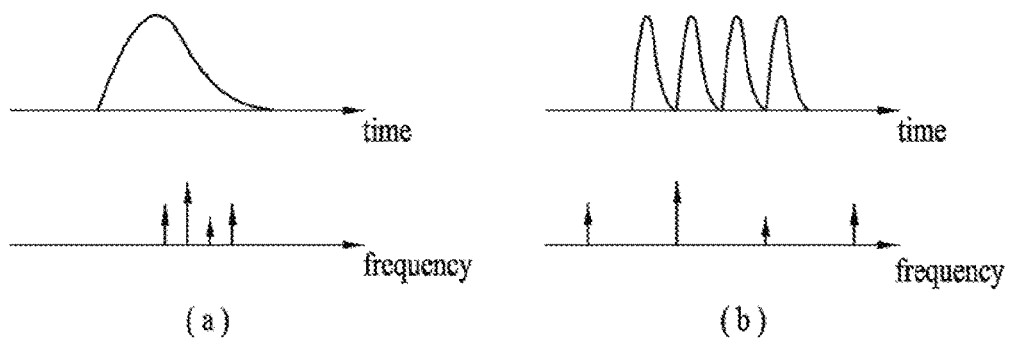
FIG. 20 to FIG. 23 illustrate embodiments of the present invention regarding the structure of an LTE-U preamble.

While the eNB/LTE-U device transmits the LTE-U preamble in every RRP which is secured through a scheme such as CCA/LBT, the eNB/LTE-U device may selectively transmit the LTE-U preamble only in partial RRPs when necessary. Alternatively, as illustrated in FIG. 18, the LTE-U preamble may be selectively transmitted only through partial resource regions among resource regions in which the LTE-U preamble is transmitted even in an RRP. In this case, whether the LTE-U preamble is actually transmitted in a specific RRP or in a resource region in which the LTE-U preamble can be transmitted and a frequency/time location at which the preamble is transmitted may be indicated through:

1) Pcell,
2) Pcell or licensed Scell, or
3) Unlicensed Scell on which the LTE-U preamble is transmitted.

For example, the above information may be indicated through DCI (PDCCH) transmitted by a cell performing indication.

If whether the LTE-U preamble is transmitted is indicated through the DCI (i.e. PDCCH) transmitted by a cell performing indication, the following method may be used. Hereinafter, the LTE-U preamble may mean a synchronization signal. In addition, a cell on which the PDCCH or DCI indicating whether the LTE-U preamble has actually been transmitted is transmitted may be:

1) PCell,
2) PCell or licensed SCell,
3) Unlicensed Scell on which the LTE-U preamble is transmitted.

Method B-1. Whether the LTE-U preamble is transmitted (through a designated resource region) in a specific subframe may be indicated through a PDCCH/DCI transmitted at the index/location/timing of the subframe. For example, whether the LTE-U preamble is transmitted at a location (e.g. 6 central PRBs in OFDM symbol #5 or #6) designated as the index/location/timing of the subframe may be indicated through DCI of every subframe. Alternatively, when the LTE-U preamble can be transmitted only through some subframes (e.g. subframes #0 and #5), whether the LTE-U preamble is transmitted at a designated location (e.g. 6 central PRBs in OFDM symbol #5 or #6) of the subframe may be indicated through DCI transmitted at the index/location/timing of the subframe.

Method B-2. To indicate whether the LTE-U preamble is transmitted (through a designated resource region) in a specific subframe (e.g. subframe #n), whether the LTE-U preamble is transmitted may be indicated through a PDCCH/DCI transmitted at an index/location/timing of a subframe (e.g. subframe #n–k) in which the PDCCH/DCI for scheduling a PDSCH transmitted in the corresponding subframe (e.g. subframe #n) is transmitted. That is, when cross-subframe scheduling is considered for PDSCH transmission, the PDCCH/DCI for scheduling the PDSCH transmitted in subframe #n may be transmitted in subframe #n–k. In this case, whether the LTE-U preamble is transmitted in subframe #n may be indicated through the DCI transmitted in subframe #n–k.

Method B-3. In order to pre-inform the UE that the LTE-U preamble is transmitted at a specific location, whether the LTE-U preamble is transmitted (through a designated resource region) in a specific subframe (e.g. subframe #n) may be indicated through the PDCCH/DCI transmitted at the index/location/timing of a subframe (i.e. subframe #n–k) prior to k subframes. For example, whether the LTE-U preamble is transmitted in subframe #n may be indicated through the PDCCH/DCI transmitted in subframe #n–1.

Method B-4. When the first subframe in which the PDCCH/DCI can be transmitted during an RRP (or the first subframe in which the PDCCH/DCI for scheduling the PDSCH during the RRP can be transmitted) is subframe #n, whether the LTE-U preamble is transmitted (through a designated resource region) during the RRP may be indicated through the PDCCH/DCI transmitted in subframe #n. In this case, if the LTE-U preamble can be transmitted multiple times during the RRP, whether all LTE-U preambles capable of being transmitted during the RRP are transmitted may be indicated through the PDCCH/DCI. Alternatively, whether a plurality of LTE-U preambles capable of being transmitted during the RRP is transmitted may be indicated through the PDCCH/DCI (using bitmaps which are mapped to the plural LTE-preambles in one-to-one correspondence).

<C. Structure of LTE-U Preamble>

FIGS. 19, 20, 21, 22, and 23 illustrate embodiments of the present invention regarding the structure of an LTE-U preamble.

This section proposes embodiments regarding a transmission resource location and a transmission form when the LTE-U preamble is transmitted.

In this case, the meaning of "LTE-U preamble is transmitted" may include a procedure of transmitting a channel reservation signal during a timing gap until the LTE-U preamble is transmitted after the eNB/LTE-U device occupies a channel. Alternatively, the LTE-U preamble may include a structure including the channel reservation signal transmitted during the timing gap. Although a description will be given excluding the reservation signal in this section, it is apparent that embodiments of the present invention include the case in which the reservation signal is transmitted.

Embodiment C-1. Structure 1 of LTE-U Preamble (or Synchronization Signal

The LTE-U preamble may be transmitted aperiodically or at a long period. In this case, the UE should be able to perform synchronization with a cell on which the LTE-U preamble is transmitted through one-time reception of the preamble.

An embodiment of the present invention proposes that the LTE-U preamble consist of a plurality of PSS/SSS sets or a plurality of PSSs (or SSSs) or that the LTE-U preamble include a plurality of PSS/SSS sets or a plurality of PSSs (or SSSs). For example, in a plurality of PSS/SSS sets, a PSS and an SSS may be alternately located in order of OFDM symbols. When the PSS/SSS sets are repeated three times, referring to FIG. 19(a), a PSS, an SSS, a PSS, an SSS, a PSS, and an SSS are located on OFDM symbols #0, #1, ..., #5, respectively. As another example, PSSs may be repeated first in order of OFDM symbols and SSSs may be repeatedly located next. Referring to FIG. 19(b), when the PSS/SSS set is repeated three times, a PSS, a PSS, a PSS, an SSS, an SSS, and an SSS may be located on OFDM symbols #0, #1, ..., #5, respectively.

In this case, in order to improve a correlation characteristic of a synchronization signal, the phase of the synchronization signal may become different on each OFDM symbol resource (or with respect to each repeatedly transmitted PSS/SSS). For example, when the PSS/SSS is repeatedly transmitted twice on the time axis, a legacy PSS/SSS sequence is transmitted at the first PSS/SSS transmission location (i.e. first PSS/SSS resource), whereas a sequence phase-shifted by $\pi$ from the legacy PSS/SSS sequence may be transmitted at the second PSS/SSS transmission location. If the PSS/SSS is repeatedly transmitted four times on the time axis region, the legacy PSS/SSS sequence is transmitted at the first PSS/SSS transmission location, a sequence phase-shifted by $\pi/2$ from the legacy PSS/SSS sequence is transmitted at the second PSS/SSS transmission location, a sequence phase-shifted by $\pi$ from the legacy PSS/SSS sequence may be transmitted at the third PSS/SSS transmission location, and a sequence phase-shifted by $3\pi/2$ from the legacy PSS/SSS sequence may be transmitted at the fourth PSS/SSS transmission location. Alternatively, in order to improve a correlation characteristic of the synchronization signal, a root sequence of the synchronization signal may become different on each OFDM symbol resource (or with respect to each repeatedly transmitted PSS or SSS). Alternatively, a distinguishable sequence for each PSS/SSS resource may be transmitted by multiplying a different PN sequence by on each OFDM symbol resource (or each repeatedly transmitted PSS or SSS).

Embodiment C-2. Structure 2 of LTE-U Preamble (or Synchronization Signal

In an LTE-U environment, the UE should be capable of performing synchronization with a cell on which an LTE-U preamble is transmitted through one-time reception of the preamble. However, in an unlicensed band, a transmittable maximum power value per unit frequency may be restricted. In this case, when a cell having a system bandwidth of, for example, 20 MHz transmits a synchronization signal (or LTE-U preamble) using only 6 center PRBs, it may be impossible to intensively allocate transmission power to the 6 center PRBs due to restriction on a maximum power value per unit frequency region in order to raise the transmission power of the synchronization signal (or LTE-U preamble). Accordingly, it may be desirable to transmit the synchronization signal (or LTE-U preamble) through resources of a wider frequency region than a legacy region.

Method C-A

Accordingly, the present invention proposes that the synchronization signal constituting the LTE-U preamble (or including the LTE-U preamble) have a form in which zero insertion to a legacy sequence is performed. That is, when a frequency axis sequence of a legacy PSS/SSS is d(0), d(1), ..., d(61), an embodiment of the present invention proposes that a PSS/SSS be transmitted through resources of a wider frequency region by inserting a predetermined number of zero-power REs into REs of the legacy PSS/SSS. For example, if three zero-power REs are inserted into REs of the legacy PSS/SSS, the synchronization signal (or LTE-U preamble) may be transmitted through frequency resources four times wider than legacy resources. In this case, the frequency axis sequence of a new synchronization signal may be represented as d(0),0,0,0,d(1),0,0,0,d(2), 0,0,0, ... ,0,0,0,d(60),0,0,0,d(61) and the synchronization signal may be transmitted at a center part on the frequency axis.

If any signal as illustrated in FIG. 20(a) is repeatedly transmitted at a shorter period on the time axis, the signal appears on the frequency axis as a form in which zero values are inserted between legacy sequence values. Accordingly, the proposed form of PSS/SSS transmission may be resultantly equivalent to the transmission form of the LTE-U preamble proposed in Method C-B below.

Figure 21:
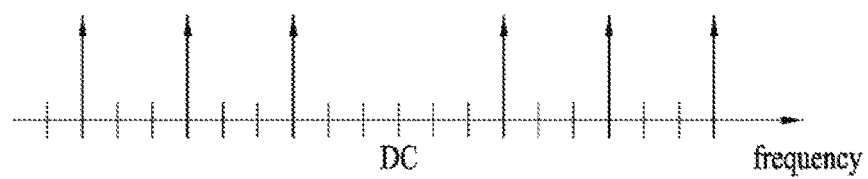
Figure 22:
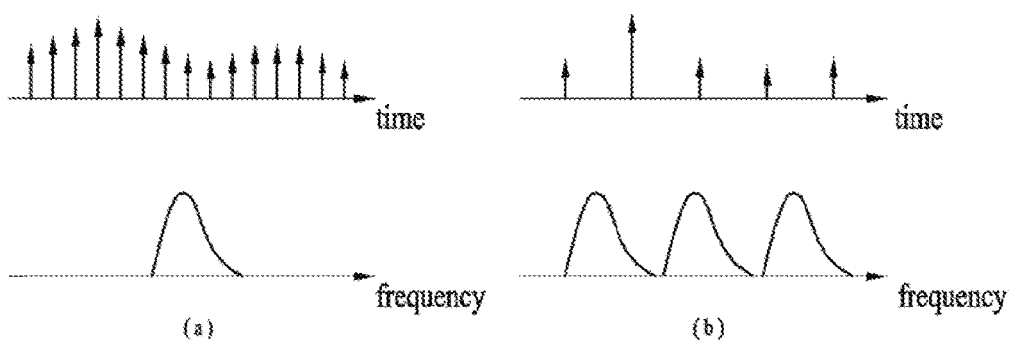
Figure 23:
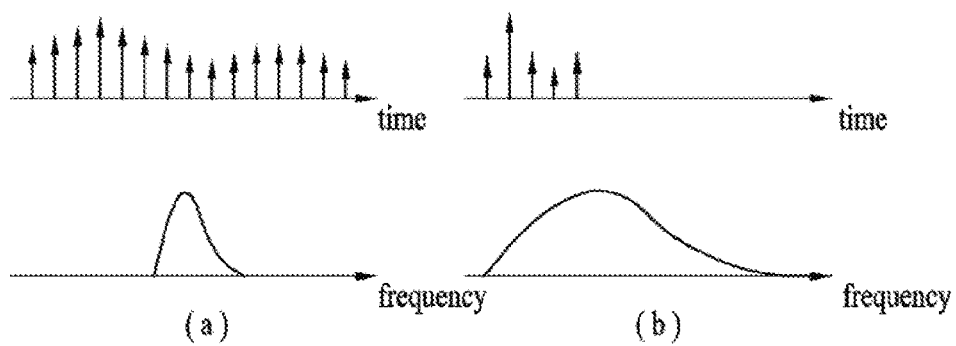

To equalize the form of the LTE-U preamble to the transmission form of the LTE-U preamble proposed in Method C-B, N zero-power REs may be inserted into both sides based on a DC time (i.e. DC component) in a center frequency region. That is, as illustrated in FIG. 21, when N zero-power REs are inserted, the N zero-power REs are inserted into each of both sides of the DC tone in the center frequency region. As a result, the N zero-power REs, the DC tone, and the N zero-power REs may be consecutively located. From the perspective of signal-to-RE mapping, the N zero-power REs and REs (i.e. non-zero-power REs) on which signals are transmitted are alternatively transmitted in a non-center frequency region, whereas REs in the center frequency region appear such that 2*N zero-power REs may be consecutively located.

Method C-B

An embodiment of the present invention proposes that the LTE-U preamble have a form in which a signal/sequence having a length of 1/N of a legacy OFDM symbol length is repeated N times on the time axis in one OFDM symbol. A PSS/SSS having a length of 1/N of the legacy OFDM symbol length may be repeatedly transmitted N times on the time axis in one OFDM symbol. Such repeated transmission of a PSS/SSS in the OFDM symbol may be performed over multiple OFDM symbols.

If any signal as illustrated in FIG. 20(a) is repeatedly transmitted at a shorter period on the time axis, the signal appears on the frequency axis as a form in which zero values are inserted between legacy sequence values. Accordingly, the proposed form of PSS/SSS transmission may be resultantly equivalent to the transmission form of the LTE-U preamble proposed in Method C-A.

In this case, the sequence form of the repeatedly transmitted PSS/SSS may be changed in order to improve a correlation characteristic of the synchronization signal. The methods of improving the correlation characteristic of the synchronization signal, proposed in "Structure 1 of LTE-U preamble (or synchronization signal)", may also be applied even when the PSS/SSS is repeatedly transmitted in an OFDM symbol.

In an LTE-U preamble (or in a period of OFDM symbols in which the synchronization signal in the LTE-U preamble is transmitted) or in a period of OFDM symbols in which the synchronization signal in an LTE-A frame transmission period is transmitted, PRB resources on which the synchronization signal is not transmitted may be used for transmission of other signals/channels. In other words, resources which are not used for transmission of the synchronization signal among resources available for transmission of the synchronization signal may be used for transmission of other signals/channels.

When the PSS/SSS is transmitted over a plurality of OFDM symbols and is repeatedly transmitted on the time axis in each OFDM symbol, since the same signal is repeatedly transmitted multiple times in one OFDM symbol, it may be difficult for the UE to identify a boundary of OFDM symbols in which the PSS/SSS is transmitted. To solve this problem, the number of repetitions of the PSS/SSS on the time axis may differ with respect to each of a plurality of OFDM symbols over which the PSS/SSS is transmitted. For example, the LTE-U preamble may be transmitted in a form in which the PSS/SSS is repeated N1 times on the time axis in a corresponding OFDM symbol in each of partial OFDM symbols corresponding to the front part of the plural OFDM symbols and the PSS/SSS may be repeatedly transmitted N2 times on the time axis in a corresponding OFDM symbol of each of OFDM symbols corresponding to the rear part of the plural OFDM symbols. For example, if the PSS/SSS transmitted as the LTE-U preamble is transmitted through two OFDM symbols, the PSS/SSS may be repeated N1 times on the time axis in the front OFDM symbol and the PSS/SSS may be repeated N2 times on the time axis in the second OFDM symbol.

The structure of the LTE-U preamble or synchronization signal proposed in the present invention includes a form of a combination of the time axis location and frequency axis location of the above-mentioned LTE-U preamble or synchronization signal.

In addition, in the embodiments of the present invention, a DRS may be used as the LTE-U preamble or the synchronization signal. That is, the embodiments of the present invention include an embodiment in which the LTE-U preamble or the synchronization signal uses the structure of the DRS or the DRS (or modified DRS) is used as the LTE-U preamble.

In addition, the embodiments of the present invention include an embodiment in which the LTE-U preamble or the synchronization signal is replaced with a positioning RS (PRS). The PRS is transmitted only in RBs in DL subframes configured for PRS transmission. The PRS is transmitted over antenna port 6. PRS sequence $r_{l,n_s}(m)$ is mapped to complex-valued modulation symbols $a^{(p)}_{k,l}$ as an RS for antenna port 6 in slot $n_s$ according to the following equation.

$$a_{k,l}^{(p)} = r_{l,n_s}(m')$$ Equation 12

In this case, k, l, m, and m' are given by Equation 13 for a normal CP and by Equation 14 for an extended CP.

$$k = 6(m + N_{RB}^{DL} - N_{RB}^{PRS}) + (6 - l + v_{shift}) \bmod 6$$ Equation 13

$$l = \begin{cases} 3, 5, 6 & \text{if } n_s \bmod 2 = 0 \\ 1, 2, 3, 5, 6 & \text{if } n_s \bmod 2 = 1 \text{ and} \\ & (1 \text{ or } 2 \text{ PBCH antenna ports}) \\ 2, 3, 5, 6 & \text{if } n_s \bmod 2 = 1 \text{ and} \\ & (4 \text{ PBCH antenna ports}) \end{cases}$$

$$m = 0, 1, \ldots, 2 \cdot N_{RB}^{PRS} - 1$$
$$m' = m + N_{RB}^{max,DL} - N_{RB}^{PRS}$$

$$k = 6(m + N_{RB}^{DL} - N_{RB}^{PRS}) + (5 - l + v_{shift}) \bmod 6$$ Equation 14

$$l = \begin{cases} 4, 5 & \text{if } n_s \bmod 2 = 0 \\ 1, 2, 4, 5 & \text{if } n_s \bmod 2 = 1 \text{ and} \\ & (1 \text{ or } 2 \text{ PBCH antenna ports}) \\ 2, 4, 5 & \text{if } n_s \bmod 2 = 1 \text{ and} \\ & (4 \text{ PBCH antenna ports}) \end{cases}$$

$$m = 0, 1, \ldots, 2 \cdot N_{RB}^{PRS} - 1$$
$$m' = m + N_{RB}^{max,DL} - N_{RB}^{PRS}$$

In this case, $N^{max,DL}_{RB}$ denotes the largest DL bandwidth configuration expressed as a multiple of $N^{RB}_{sc}$. A bandwidth $N^{PRS}_{RB}$ for PRS transmission is configured by a higher layer. A cell-specific frequency shift for the PRS may be given as $v_{shift} = N^{cell}_{ID} \bmod 6$. In this case, $N^{cell}_{ID}$ is a physical cell ID. The PRS is transmitted only in configured DL subframes. The DL subframes for PRS transmission may be configured by a higher layer using $I_{PRS}$ corresponding to a cell-specific subframe configuration duration $T_{PRS}$ and a cell-specific subframe offset $\Delta_{PRS}$. The PRS is transmitted in $N_{PRS}$ consecutive DL subframes and $N_{PRS}$ is configured by a higher layer. For example, the first subframe among the $N_{PRS}$ DL subframes in which the PRS is transmitted satisfies $(10n_f + \text{floor}(n_s/2) - \Delta_{PRS}) \bmod T_{PRS} = 0$. In this case, $n_f$ is a radio frame number, $n_s$ is a slot number in the radio frame, and floor($n_s/2$) corresponds to a subframe number in the radio frame. For more details of the PRS, refer to standard document 3GPP TS 36.211 V11.5.0.

The embodiments of the present invention include an embodiment in which the LTE-U preamble or the synchronization signal (i.e. synchronization signal) uses the structure of the PRS without change or the PRS (or modified PRS) is used as the LTE-U preamble.

The embodiments of the present invention include an embodiment in which the LTE-U preamble or the synchronization signal uses the structure/form of a DM RS or an SRS used for UL transmission without change or uses the modified structure/form of the DM RS or the SRS.

Embodiment C-3. Structure 3 of LTE-U Preamble (or Synchronization Signal

In an LTE-U environment, it may be impossible to intensively allocate power to 6 central PRBs due to restrictions on a maximum power value per unit frequency region. Accordingly, it is desirable to transmit the synchronization signal (or LTE-U preamble) through resources of a wider frequency region than a legacy region.

Method C-C

To this end, the PSS/SSS may be repeatedly transmitted on the frequency axis. For example, the PDD/SSS which has been transmitted in 6 central PRBs may be transmitted over an entire band by being repeatedly transmitted on the frequency axis. That is, an embodiment of the present invention proposes that the LTE-U preamble have a form in which a legacy PSS/SSS is repeated N times on the frequency axis.

If a certain signal as illustrated in FIG. 22(a) is transmitted only once at N sample(s) on the time axis as illustrated in FIG. 22(b) and is transmitted at zero power at the other sample(s), the signal appears as a form in which a legacy sequence is repeatedly transmitted on the frequency axis. Therefore, the form of the LTE-U preamble according to the embodiment of the present invention in which the legacy PSS/SSS is repeated N times on the frequency axis may be equivalent to the form of transmitting the legacy PSS/SSS only once at N sample(s) on the time axis. When the legacy PSS/SSS is transmitted in the form of s(0),s(1),s(2), . . . at each sample location of the time axis, the PSS/SSS in the proposed LTE-U preamble may be transmitted in the form of s(0),0,0,s(3),0,0,s(6),0,0, . . . when N is 3.

Method C-D

As another method of transmitting the PSS/SSS in a wider region of the frequency axis, the following methods may be considered.

Any signal as illustrated in FIG. 23(a) may be transmitted in a compressed form on the time axis using fewer samples (e.g. 1/N samples) as illustrated in FIG. 23(b). When the legacy PSS/SSS is transmitted in the form of s(0),s(1), s(2), . . . at each sample location of the time axis, the PSS/SSS may be transmitted in the form of s(0),s(3),s(6),s (9),s(12), . . . when N is 3. If the signal is transmitted in this way, signal transmission on the frequency axis appears such that a legacy sequence is transmitted in a frequency resource region corresponding to N times a legacy region as illustrated in FIG. 23(b).

Embodiment C-4. Structure 4 of LTE-U Preamble (or Synchronization Signal

If the LTE-U preamble is transmitted using the above-proposed "Structure 2 of LTE-U preamble (or synchronization signal)", since the LTE-U preamble has a form in which the PSS/SSS is repeatedly transmitted N times in an OFDM symbol, a problem occurs in which a maximum timing error value capable of being detected in the PSS/SSS is reduced by 1/N relative to the legacy PSS/SSS.

To prevent this problem, an embodiment of the present invention proposes that the PSS be repeatedly transmitted on the time axis in an OFDM symbol using the above-proposed "Structure 2 of LTE-U preamble (or synchronization signal)" and the SSS be transmitted in a wider region of the frequency axis region than a legacy region using the above-proposed "Structure 3 of LTE-U preamble (or synchronization signal)". While this scheme has a problem of reducing a maximum timing error value capable of being transmitted in the PSS by 1/N, the UE may compensate for this problem by receiving the SSS.

Conversely, another embodiment of the present invention proposes that the SSS be repeatedly transmitted on the time axis in an OFDM symbol using the above-proposed "Structure 2 of LTE-U preamble (or synchronization signal)" and the PSS be transmitted in a wider region of the frequency axis than a legacy region using the above-proposed "Structure 3 of LTE-U preamble (or synchronization signal)". Although this scheme has a problem of reducing a maximum timing error value capable of being detected in the SSS by 1/N, the UE may perform rough time synchronization through reception of the PSS and perform more detailed time synchronization through the SSS.

As another embodiment of the present invention, when the PSS/SSS is transmitted through a plurality of OFDM symbols, the PSS/SSS of some OFDM symbol(s) may be repeatedly transmitted on the time axis in corresponding OFDM symbols using the above-proposed "Structure 2 of LTE-U preamble (or synchronization signal)" and the PSS/ SSS on the other OFDM symbols may be transmitted in a wider region of the frequency axis region than a legacy region using the above-proposed "Structure 3 of LTE-U preamble (or synchronization signal)".

Structures 2, 3, and 4 of the LTE-U preamble (or synchronization signal) described above may also be applied to a random access preamble transmitted by the UE for UL synchronization. In a physical layer, the random access preamble consists of a cyclic prefix (CP) having a length of $T_{CP}$ and a sequence part having a length of $T_{SEQ}$. $T_{CP}$ and $T_{SEQ}$ depend on a frame structure and random access configuration and a higher layer controls a preamble format shown in Table 5.

TABLE 5

| Preamble format | $T_{CP}$ | $T_{SEQ}$ |
| --- | --- | --- |
| 0 | 3168 · $T_s$ | 24576 · $T_s$ |
| 1 | 21024 · $T_s$ | 24576 · $T_s$ |
| 2 | 6240 · $T_s$ | 2.24576 · $T_s$ |
| 3 | 21024 · $T_s$ | 2.24576 · $T_s$ |
| 4 (see NOTE) | 448 · $T_s$ | 4096 · $T_s$ |

NOTE: Frame structure type 2 and special subframe configuration with UpPTS lengths 4384 · $T_s$ and 5120 · $T_s$ only.

Upon being triggered by a MAC layer, transmission of the random access preamble is limited by certain time and frequency resources. These resources are enumerated in order of increases of a subframe number in PRBs in a radio frame and the frequency domain so that index 0 may correspond to the lowest PRB and subframe in the radio frame. For frame structure type 1, according to Structures 2, 3, and 4 of the LTE-U preamble (or synchronization signal) described above, a signal to which repetition/sampling/ interpolation of frequency/time is applied may be based on PRACH preamble formats 0 to 4.

In the LTE system, a plurality of PRACH signals may be adjacently transmitted on the time axis so that transmission of the PRACH signals may occupy a wider bandwidth in the system while using a PRACH signal defined by a bandwidth of 6 RBs (about 1.4 MHz) as a basic structure. In addition, frequency band hopping may be applied to transmission of the PRACH signals so that each PRACH signal may occupy a different frequency band. Alternatively, the PRACH signals may be adjacently transmitted on the time axis so as to occupy a longer time and each PRACH signal may be transmitted on an extended frequency bandwidth as in Structures 2, 3, and 4 of the LTE-U preamble (or synchronization signal) described above.

<D. Inter-Cell Measurement>

In an LTE-U environment in which it is difficult to periodically transmit a synchronization signal as in a legacy scheme, transmission of a synchronization signal or transmission of an LTE-U preamble is associated with measurement for a serving LTE-U cell or a neighbor LTE-U cell of the UE, performed by the UE. To perform measurement for a specific LTE-U cell, the UE may identify information about a timing at which a signal for measurement for a specific cell is transmitted by directly performing intra/inter-cell measurement using the synchronization signal or the LTE-U preamble or performing synchronization and detection for the specific cell through the synchronization signal or the LTE-U preamble. Accordingly, the UE should be aware of a timing at which the synchronization signal or LTE-U preamble of an LTE-U cell is transmitted so that synchronization and cell detection may be performed and measurement for the cell may be performed.

For example, the UE may measure reference signal received power (RSRP) and reference signal received quality (RSRQ) using the synchronization signal (i.e. LTE-U preamble) according to any one of the embodiments of the present invention.

RSRP measurement provides a cell-specific signal strength metric. RSRP measurement is mainly used to determine candidate cells (or candidate CCs) according to signal strength or is used as input for determining handover and cell reselection. The RSRP is defined with respect to a specific cell (or specific CC) as linear average of power distribution of REs carrying an RS in a considered frequency bandwidth. The specific cell is also called a reference cell.

The RSRQ is used to provide a cell-specific signal quality metric and is mainly used to determine an order of candidate cells (or candidate CCs) according to signal quality in a similar manner to the RSRP. When RSRP measurement does not provide information sufficient to determine reliable mobility, the RSRQ may be used as input for handover and cell reselection. The RSRQ is defined as "N*RSRP/RSSI" where N is the number of RBs of RSSI measurement bandwidth. A received signal strength indicator (RSSI) is defined as all sorts of powers including a total received wideband power, adjacent channel interference, and thermal noise, observed by the UE from all sources including co-channel serving and non-serving cells in a measurement bandwidth. Therefore, the RSRQ may be the ratio of pure RS power to total power received by the UE.

In this section, a method in which the UE performs measurement for an inter/intra LTE-U cell in an unlicensed band is proposed.

For reference, intra-cell measurement means measurement in carrier frequencies of serving cell(s) and inter-cell measurement means measurement in frequencies different from any frequencies among the carrier frequencies of the serving cell(s).

Method D-1

The UE may perform measurement for the inter-LTE-U cell at a timing at which measurement for a serving LTE-U cell is performed.

If one LTE-U cell occupies a channel, it may be assumed that neighbor LTE-U cells use the channel altogether. Therefore, it may be assumed that, at a timing at which one LTE-U cell transmits a synchronization signal (or LTE-U preamble) and/or a measurement signal, neighbor LTE-U cells also transmit the synchronization signal (or LTE-U preamble) and/or the measurement signal.

Measurement timing information for an unlicensed serving cell may be configured for the UE by a serving cell of the UE (a Pcell, an Scell located on a licensed carrier, or a serving LTE-U cell). The UE may perform measurement for a serving cell thereof at a corresponding timing and perform inter-cell measurement for a neighbor LTE-U cell at the corresponding timing. Alternatively, the UE may assume that the synchronization signal (or LTE-U preamble) and/or the measurement signal is transmitted at the corresponding timing from the serving cell and the neighbor cell. Alternatively, the UE may receive measurement timing information configured for neighbor LTE-U cells separately from the measurement timing information for the serving LTE-U cell and perform measurement for the neighbor cells.

Information as to whether the synchronization signal (or LTE-U preamble) and/or the measurement signal for a serving cell is transmitted and/or information about a transmission timing may be configured for the UE by the serving cell of the UE (a Pcell, an Scell located on a licensed carrier, or a serving LTE-U cell). Then, the UE may perform measurement for the serving cell thereof at the corresponding timing and perform inter-cell measurement for a neighbor LTE-U cell at the corresponding timing. Alternatively, the UE may assume that the synchronization signal (or LTE-U preamble) and/or the measurement signal is transmitted from the serving cell and neighbor cells at the corresponding timing. Separately from the information as to whether the synchronization signal (or LTE-U preamble) and/or the measurement signal for the serving LTE-U cell is transmitted and/or the information about a transmission timing, the UE may receive information as to whether a synchronization signal (or LTE-U preamble) and/or a measurement signal for the neighbor cells and/or information about a transmission timing and perform measurement for the neighbor cells at the corresponding timing.

Method D-2

If the synchronization signal (or LTE-U preamble) is periodically transmitted as described in Embodiment B-C (FIGS. 16 and 17) of Section B, the UE may perform measurement for a serving cell through the synchronization signal (or LTE-U preamble).

To the end, information about a preamble period for a serving LTE-U cell of the UE may be configured for the UE. Additionally, information about an LTE-U preamble duration may also be configured for the UE. The UE may perform measurement for the serving cell thereof using corresponding timing information and use the timing information to perform inter-cell measurement for a neighbor LTE-U cell. That is, the UE may assume that the information about the preamble period (and the information about the LTE-U preamble duration) for the serving cell is identically applied even to the neighbor cell.

Alternatively, the UE may receive information about a preamble period (and information about an LTE-U preamble duration) for the neighbor cell from the serving cell, separately from the information about the preamble period (and the information about the LTE-U preamble duration) for the serving LTE-U cell thereof and perform measurement for the neighbor cell using corresponding timing information.

Additionally, information as to whether the LTE-U preamble has actually been transmitted at a timing at which the LTE-U preamble for the serving LTE-U cell of the UE is transmitted may be configured for the UE by the serving cell. In this case, if the LTE-U preamble has not been transmitted, the UE may exclude resources on which the LTE-U preamble is transmitted at the timing from resources on which synchronization and measurement are performed. Information as to whether the LTE-U preamble has actually been transmitted at a timing at which the LTE-U preamble for the neighbor cell is transmitted may also be configured for the UE by the serving cell. Alternatively, the UE may identically apply "information as to whether the LTE-U preamble has actually been transmitted at a timing at which the LTE-U preamble is transmitted" for the serving LTE-U cell thereof to the neighbor cell. That is, if the LTE-U preamble has been transmitted in the serving cell of the UE, the UE may assume that the LTE-U preamble of the neighbor cell has also been transmitted.

Method D-3

The eNB rather than the UE may perform measurement for a neighbor cell around a serving LTE-U cell. The eNB may perform measurement using a synchronization signal (or LTE-U preamble) and/or a measurement signal transmitted from the neighbor cell. In this case, the eNB may receive timing information of the synchronization signal (or LTE-U preamble) and/or the measurement signal transmitted by the neighbor cells on a backhaul link.

Method D-4

The UE may transmit a UL signal (e.g. SRS) in a licensed band (frequency region in which measurement is to be performed) and LTE-UE eNBs may perform measurement by receiving the UL signal transmitted by the UE. In this case, a serving eNB of the UE may inform neighbor LTE-U eNB(s) of information about a time/frequency resource (e.g. SRS configuration) on which the UL signal is to be transmitted.

Figure 24:
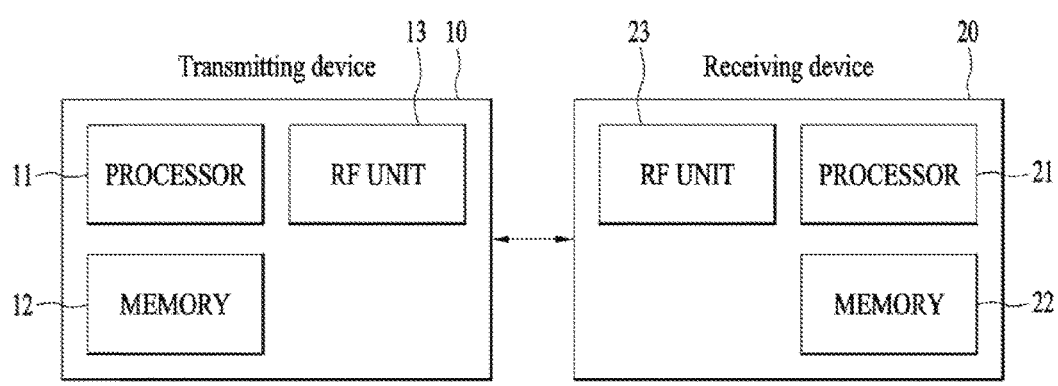
FIG. 24 is a block diagram illustrating elements of a transmitting device 10 and a receiving device 20 for implementing the present invention.

FIG. 24 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor may generate information about synchronization signal configuration in an RRP according to any one of the above-described embodiments of the present invention. The eNB processor may control the eNB RF unit to transmit an LTE-U preamble, i.e. a synchronization signal, according to the synchronization signal configuration information, using time-frequency resources in the RRP according to any one of the above-described embodiments of the present invention. For example, the eNB processor may control the eNB RF unit to transmit the synchronization signal configuration information according to any one of the embodiments proposed in Section B and control the eNB RF unit to transmit the synchronization signal corresponding to the synchronization signal configuration information on an LTE-U cell. The eNB processor may control the eNB RF unit to transmit a PSS/SSS or a PRS as the synchronization signal according to any one of the above-described embodiments. For example, the eNB processor may control the eNB RF unit to transmit the synchronization signal having a structure according to any one of the embodiments proposed in Section C on the LTE-U cell.

The UE processor may control the UE RF unit to receive the synchronization signal configuration information according to any one of the above-described embodiments of the present invention. For example, the UE processor may control the UE RF unit to detect the synchronization signal configuration information including information according to any one of the embodiments proposed in Section B on any one (e.g. non-LTE-U cell) of cells configured for the UE. The UE processor may control the UE RF unit to receive or detect the synchronization signal on an LTE-U cell associated with the synchronization signal configuration information based on the synchronization signal configuration information. The UE processor may receive the synchronization signal having a structure according to any one of the above-described embodiments of the present invention on the LTE-U cell. For example, the UE processor may detect the PSS/SSS or the PRS on the LTE-U cell according to any one of the embodiments proposed in Section C and recognize the PSS/SSS or the PRS as the synchronization signal. The UE processor may acquire time-frequency synchronization with the LTE-U cell based on the synchronization signal detected on the LTE-U cell. The UE processor may perform measurement for the LTE-U cell based on the synchronization signal detected on the LTE-U cell.

The synchronization signal of the embodiments of the present invention may be transmitted by the UE rather than the eNB. For example, the UE processor may control the UE RF unit to receive the synchronization signal configuration information according to any one of the embodiments of the present invention and control the UR RF unit to transmit the synchronization signal according to the synchronization signal configuration information. The UE processor may generate a random access preamble or an SRS as the synchronization signal. The UE processor may control the UE RF unit to transmit the random access preamble or the SRS in the RRP on the LTE-U cell according to the synchronization signal configuration information. The eNB processor may configure configuration information about a UL synchronization signal that the UE should transmit in the RRP on the LTE-U cell and control the eNB RF unit to transmit the configuration information. The eNB processor may control the eNB RF unit to receive or detect the UL synchronization signal in the RRP on the LTE-U cell based on the configuration information. The eNB processor may perform measurement for the LTE-U cell based on the UL synchronization signal.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

The invention claimed is:

1. A method for receiving, by a user equipment, a discovery signal, the method comprising:
receiving, by the user equipment, a synchronization signal of a licensed cell operating in a licensed spectrum;
acquiring, by the user equipment, time and frequency synchronization with the licensed cell based on the synchronization signal of the licensed cell;
receiving, by the user equipment, discovery signal configuration information for a unlicensed cell configured as a serving cell for the user equipment through the licensed cell; and
receiving, by the user equipment, a discovery signal of the unlicensed cell on the unlicensed cell based on the discovery signal configuration information,
wherein the discovery signal configuration information includes information indicating a discovery signal configuration periodicity at which a discovery signal configuration duration occurs,
wherein the user equipment assumes that the discovery signal of the unlicensed cell may occur in any one of subframes within the discovery signal configuration duration,
wherein the synchronization signal of the licensed cell is present on 6 center resource blocks of the licensed cell, and
wherein the discovery signal of the unlicensed cell includes a synchronization signal of the unlicensed cell, and the synchronization signal of the unlicensed cell is present on a wider frequency resource region than 6 center resource blocks of the unlicensed cell.

2. The method according to claim 1,
wherein the synchronization signal of the licensed cell includes a sequence of symbols d(0),d(1), . . . ,d(61) for the licensed cell, and the symbols d(0),d(1), . . . ,d(61) for the licensed cell are respectively mapped to 62 subcarriers on the 6 center resource blocks of the licensed cell, and
wherein the synchronization signal of the unlicensed cell includes a sequence of symbols d(0),d(1), . . . ,d(61) for the unlicensed cell, and the symbols d(0), d(1), . . . ,d(61) for the unlicensed cell are respectively mapped to 62 non-consecutive subcarriers such that there are a predetermined number of zero-power subcarriers between d(i) and d(i+1), where i=0, . . . , 60.

3. The method according to claim 1,
wherein the synchronization signal of the licensed cell is present one time in each OFDM symbol used for the synchronization signal of the licensed cell, and
wherein the synchronization signal of the unlicensed cell is repeated multiple times along a time axis in each OFDM symbol used for the synchronization signal of the unlicensed cell.

4. The method according to claim 1,
wherein the synchronization signal of the licensed cell includes a sequence of symbols d(0),d(1), . . . ,d(61) for the licensed cell, and the sequence of symbols d(0),d(1), . . . ,d(61) for the licensed cell is present one time along a frequency axis of the licensed cell, and
wherein the synchronization signal of the unlicensed cell includes a sequence of symbols d(0),d(1), . . . ,d(61) for the unlicensed cell, and the sequence of symbols d(0), d(1), . . . ,d(61) for the licensed cell is present multiple times along a frequency axis of the unlicensed cell.

5. The method according to claim 1,
wherein the synchronization signal of the licensed cell is received using M time samples in each OFDM symbol used for the synchronization signal of the licensed cell, and
wherein the synchronization signal of the unlicensed cell is received using every N-th time sample among M time samples in each OFDM symbol used for the synchronization signal of the licensed cell, where N is an integer larger than 1 and smaller than M.

6. A method for transmitting, by a base station, a discovery signal, the method comprising:
    transmitting, by the base station, a synchronization signal of a licensed cell operating in a licensed spectrum;
    transmitting, by the base station, discovery signal configuration information for a unlicensed cell configured as a serving cell for a user equipment through the licensed cell; and
    transmitting, by the base station, a discovery signal of the unlicensed cell on the unlicensed cell based on the discovery signal configuration information,
    wherein the discovery signal configuration information includes information indicating a discovery signal configuration periodicity at which a discovery signal configuration duration occurs,
    wherein the discovery signal of the unlicensed cell is transmitted in any one of subframes within the discovery signal configuration duration,
    wherein the synchronization signal of the licensed cell is present on 6 center resource blocks of the licensed cell, and
    wherein the discovery signal of the unlicensed cell includes a synchronization signal of the unlicensed cell, and the synchronization signal of the unlicensed cell is present on a wider frequency resource region than 6 center resource blocks of the unlicensed cell.

7. The method according to claim 6,
    wherein the synchronization signal of the licensed cell includes a sequence of symbols d(0),d(1), . . . ,d(61) for the licensed cell, and the symbols d(0),d(1), . . . ,d(61) for the licensed cell are respectively mapped to 62 subcarriers on the 6 center resource blocks of the licensed cell, and
    wherein the synchronization signal of the unlicensed cell includes a sequence of symbols d(0),d(1), . . . ,d(61) for the unlicensed cell, and the symbols d(0),d(1), . . . ,d(61) for the unlicensed cell are respectively mapped to 62 non-consecutive subcarriers such that there are a predetermined number of zero-power subcarriers between d(i) and d(i+1), where i=0, . . . , 60.

8. The method according to claim 6,
    wherein the synchronization signal of the licensed cell is present one time in each OFDM symbol used for the synchronization signal of the licensed cell, and
    wherein the synchronization signal of the unlicensed cell is repeated multiple times along a time axis in each OFDM symbol used for the synchronization signal of the unlicensed cell.

9. The method according to claim 6,
    wherein the synchronization signal of the licensed cell includes a sequence of symbols d(0),d(1), . . . ,d(61) for the licensed cell, and the sequence of symbols d(0),d(1), . . . ,d(61) for the licensed cell is present one time along a frequency axis of the licensed cell, and
    wherein the synchronization signal of the unlicensed cell includes a sequence of symbols d(0),d(1), . . . ,d(61) for the unlicensed cell, and the sequence of symbols d(0), d(1), . . . ,d(61) for the licensed cell is present multiple times along a frequency axis of the unlicensed cell.

10. The method according to claim 6,
    wherein the synchronization signal of the licensed cell is transmitted using M time samples in each OFDM symbol used for the synchronization signal of the licensed cell, and
    wherein the synchronization signal of the unlicensed cell is transmitted using every N-th time sample among M time samples in each OFDM symbol used for the synchronization signal of the licensed cell, where N is an integer larger than 1 and smaller than M.

11. A user equipment for receiving a discovery signal, the user equipment comprising:
    a transceiver, and
    a processor configured to control the transceiver, the processor configured to:
        control the transceiver to receive a synchronization signal of a licensed cell operating in a licensed spectrum;
        acquire time and frequency synchronization with the licensed cell based on the synchronization signal of the licensed cell;
        control the transceiver to receive discovery signal configuration information for a unlicensed cell configured as a serving cell for the user equipment through the licensed cell; and
        control the transceiver to receive a discovery signal of the unlicensed cell on the unlicensed cell based on the discovery signal configuration information,
    wherein the discovery signal configuration information includes information indicating a discovery signal configuration periodicity at which a discovery signal configuration duration occurs,
    wherein the processor is configured to assume that the discovery signal of the unlicensed cell may occur at any one of subframes within the discovery signal configuration duration,
    wherein the synchronization signal of the licensed cell is present on 6 center resource blocks of the licensed cell, and
    wherein the discovery signal of the unlicensed cell includes a synchronization signal of the unlicensed cell, and the synchronization signal of the unlicensed cell is present on a wider frequency resource region than 6 center resource blocks of the unlicensed cell.

12. The user equipment according to claim 11,
    wherein the synchronization signal of the licensed cell includes a sequence of symbols d(0),d(1), . . . ,d(61) for the licensed cell, and the symbols d(0),d(1), . . . ,d(61) for the licensed cell are respectively mapped to 62 subcarriers on the 6 center resource blocks of the licensed cell, and
    wherein the synchronization signal of the unlicensed cell includes a sequence of symbols d(0),d(1), . . . ,d(61) for the unlicensed cell, and the symbols d(0), d(1), . . . ,d(61) for the unlicensed cell are respectively mapped to 62 non-consecutive subcarriers such that there are a predetermined number of zero-power subcarriers between d(i) and d(i+1), where i=0, . . . , 60.

13. The user equipment according to claim 11,
    wherein the synchronization signal of the licensed cell is present one time in each OFDM symbol used for the synchronization signal of the licensed cell, and
    wherein the synchronization signal of the unlicensed cell is repeated multiple times along a time axis in each OFDM symbol used for the synchronization signal of the unlicensed cell.

14. The user equipment according to claim 11,
    wherein the synchronization signal of the licensed cell includes a sequence of symbols d(0),d(1), . . . ,d(61) for the licensed cell, and the sequence of symbols d(0),d(1), . . . ,d(61) for the licensed cell is present one time along a frequency axis of the licensed cell, and wherein the synchronization signal of the unlicensed cell includes a sequence of symbols d(0),d(1), . . . ,d(61) for the unlicensed cell, and the sequence of symbols d(0), d(1), . . . ,d(61) for the licensed cell is present multiple times along a frequency axis of the unlicensed cell.

15. The user equipment according to claim 11,
wherein the synchronization signal of the licensed cell is received using M time samples in each OFDM symbol used for the synchronization signal of the licensed cell, and
wherein the synchronization signal of the unlicensed cell is received using every N-th time sample among M time samples in each OFDM symbol used for the synchronization signal of the licensed cell, where N is an integer larger than 1 and smaller than M.

16. A base station for transmitting a discovery signal, the base station comprising:
a transceiver, and
a processor configured to control the transceiver, the processor configured to:
control the transceiver to transmit a synchronization signal of a licensed cell operating in a licensed spectrum;
control the transceiver to transmit discovery signal configuration information for a unlicensed cell configured as a serving cell for a user equipment through the licensed cell; and
control the transceiver to transmit a discovery signal of the unlicensed cell on the unlicensed cell based on the discovery signal configuration information,
wherein the discovery signal configuration information includes information indicating a discovery signal configuration periodicity at which a discovery signal configuration duration occurs,
wherein the discovery signal of the unlicensed cell is transmitted in any one of subframes within the discovery signal configuration duration,
wherein the synchronization signal of the licensed cell is present on 6 center resource blocks of the licensed cell, and
wherein the discovery signal of the unlicensed cell includes a synchronization signal of the unlicensed cell, and the synchronization signal of the unlicensed cell is present on a wider frequency resource region than 6 center resource blocks of the unlicensed cell.

17. The base station according to claim 16,
wherein the synchronization signal of the licensed cell includes a sequence of symbols d(0),d(1), . . . ,d(61) for the licensed cell, and the symbols d(0),d(1), . . . ,d(61) for the licensed cell are respectively mapped to 62 subcarriers on the 6 center resource blocks of the licensed cell, and
wherein the synchronization signal of the unlicensed cell includes a sequence of symbols d(0),d(1), . . . ,d(61) for the unlicensed cell, and the symbols d(0), d(1), . . . ,d(61) for the unlicensed cell are respectively mapped to 62 non-consecutive subcarriers such that there are a predetermined number of zero-power subcarriers between d(i) and d(i+1), where i=0, . . . , 60.

18. The base station according to claim 16,
wherein the synchronization signal of the licensed cell is present one time in each OFDM symbol used for the synchronization signal of the licensed cell, and
wherein the synchronization signal of the unlicensed cell is repeated multiple times along a time axis in each OFDM symbol used for the synchronization signal of the unlicensed cell.

19. The base station according to claim 16,
wherein the synchronization signal of the licensed cell includes a sequence of symbols d(0),d(1), . . . ,d(61) for the licensed cell, and the sequence of symbols d(0),d(1), . . . ,d(61) for the licensed cell is present one time along a frequency axis of the licensed cell, and
wherein the synchronization signal of the unlicensed cell includes a sequence of symbols d(0),d(1), . . . ,d(61) for the unlicensed cell, and the sequence of symbols d(0), d(1), . . . ,d(61) for the licensed cell is present multiple times along a frequency axis of the unlicensed cell.

20. The base station according to claim 16,
wherein the synchronization signal of the licensed cell is transmitted using M time samples in each OFDM symbol used for the synchronization signal of the licensed cell, and
wherein the synchronization signal of the unlicensed cell is transmitted using every N-th time sample among M time samples in each OFDM symbol used for the synchronization signal of the licensed cell, where N is an integer larger than 1 and smaller than M.

* * * * *